(12) United States Patent
Kawano et al.

(10) Patent No.: US 6,803,153 B1
(45) Date of Patent: Oct. 12, 2004

(54) OPTICAL STORAGE MEDIUM, OPTICAL STORAGE METHOD; OPTICAL STORAGE APPARATUS, OPTICAL READING METHOD, OPTICAL READING APPARATUS, OPTICAL RETRIEVING METHOD AND OPTICAL RETRIEVING APPARATUS

(75) Inventors: Katsunori Kawano, Nakai-machi (JP); Yasunari Nishikata, Nakai-machi (JP); Tsutomu Ishii, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/708,498

(22) Filed: Nov. 9, 2000

Related U.S. Application Data

(62) Division of application No. 09/056,798, filed on Apr. 8, 1998, now Pat. No. 6,452,890.

(30) Foreign Application Priority Data

Apr. 11, 1997 (JP) .............................................. 9-94194
Feb. 16, 1998 (JP) .............................................. 10-32834

(51) Int. Cl.$^7$ .............................................. G03H 1/10
(52) U.S. Cl. .................. 430/1; 430/2; 430/19; 359/10; 359/24
(58) Field of Search .................. 430/945, 19, 270.15, 430/2, 270.14, 1; 359/24, 10; 369/283, 288

(56) References Cited

U.S. PATENT DOCUMENTS 3,612,641 A  * 10/1971  Eaglefield ..................... 359/22
5,024,784 A  *  6/1991  Eich et al. ............. 252/299.01

(List continued on next page.)

FOREIGN PATENT DOCUMENTS

JP  61-215543  *  9/1986  .................. 430/19
JP  02-260127  * 10/1990  .................. 430/19

(List continued on next page.)

OTHER PUBLICATIONS

Todorov, L., et al., Polarization Holography. 2: Polarization holographic gratings in photoanisotropic materials with and without intrinsic birefringence, Appl. Opt., vol. 23(24) pp. 4588–4591 (Dec. 1984).*

(List continued on next page.)

*Primary Examiner*—Martin Angebranndt
(74) *Attorney, Agent, or Firm*—Oliff & Berridge, PLC

(57) ABSTRACT

An optical storage medium of the present invention enables storage of data with high precision at high speed, and rewriting of data at high speed without an erasing process. Optical storage, reading and retrieving methods and optical storage, reading, and retrieving apparatuses using the medium are also provided. The optical storage medium has at least a polarization-sensitive member having the photo-induced birefringence property, such as a member made of polyester polymer having cyanoazobenzene as a side chain. The above apparatuses have spatial light modulator capable of modulating polarization. The modulator provides information of bit of two-dimensional data to each corresponding pixel by application or non-application of a voltage, and modulates the polarization of the beam incident on each pixel. Thereby, a signal beam transmitted through the spatial light modulator having a spatial polarization modulation corresponding to the two-dimensional data is obtained. The signal beam illuminates the optical storage medium, and at the same time, a reference beam illuminates the same region in the medium where the signal beam illuminates. Thus a hologram of the polarization modulation of the signal beam corresponding to the two-dimensional data is stored in the optical storage medium.

7 Claims, 17 Drawing Sheets

U.S. PATENT DOCUMENTS

| | | | | |
|---|---|---|---|---|
| 5,173,381 A | * | 12/1992 | Natansohn et al. | 430/19 |
| 5,216,527 A | * | 6/1993 | Sharnhoff et al. | 359/24 |
| 5,384,221 A | * | 1/1995 | Svavant et al. | 430/19 |
| 5,543,251 A | * | 8/1996 | Taylor | 430/1 |
| 5,812,233 A | | 9/1998 | Walsh et al. | 349/194 |
| 6,452,890 B2 | * | 9/2002 | Kawano et al. | 360/110.01 |

FOREIGN PATENT DOCUMENTS

| | | | | |
|---|---|---|---|---|
| JP | 03-075789 | * | 3/1991 | |
| JP | 03-149660 | * | 6/1991 | |
| JP | 06-186667 | * | 7/1994 | 430/19 |
| JP | 09-269719 | * | 10/1997 | |

OTHER PUBLICATIONS

Todorov, L., et al., Polarization Holography. 1: A new high–efficiency organic materials with reversible photoinduced birefringence, Appl. Opt., vol. 23(23) pp. 4309–4312 (Dec. 1984).*

Todorov, L., et al., Polarization Holography. 3: Soem Applications of polarization holographic recording, Appl. Opt., vol. 24(6) pp. 785–788 (Mar. 1985).*

Chen et al. "Real–time holography in azo–dye–doped liquid crystals", Opt. Lett., vol. 17(6), pp. 441–443 (Mar. 1992).*

The Merck Index, Merck & Co., Inc. (1983) pp. 874 in entry 5975.*

Translation of JP 03–075789.*

* cited by examiner

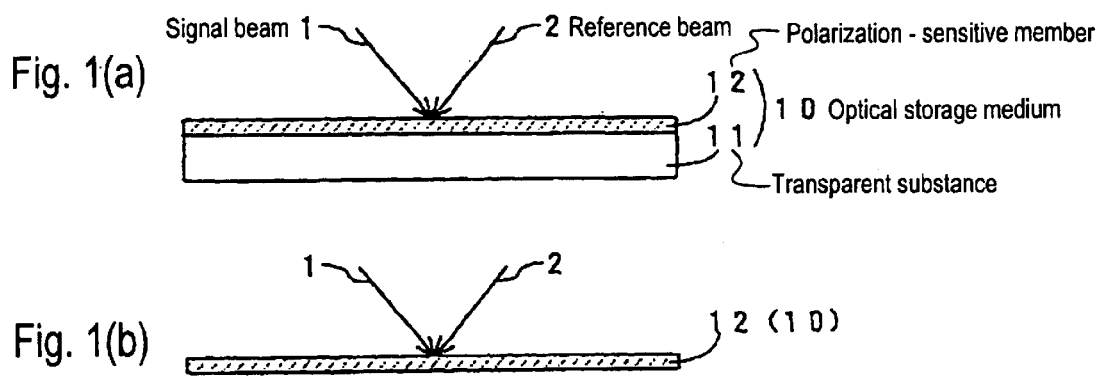
Fig. 1(a)
Fig. 1(b)
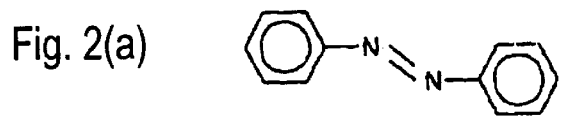
Fig. 2(a)
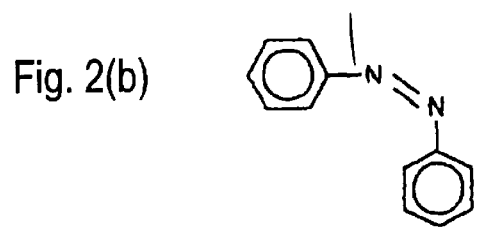
Fig. 2(b)
Fig. 2(c)
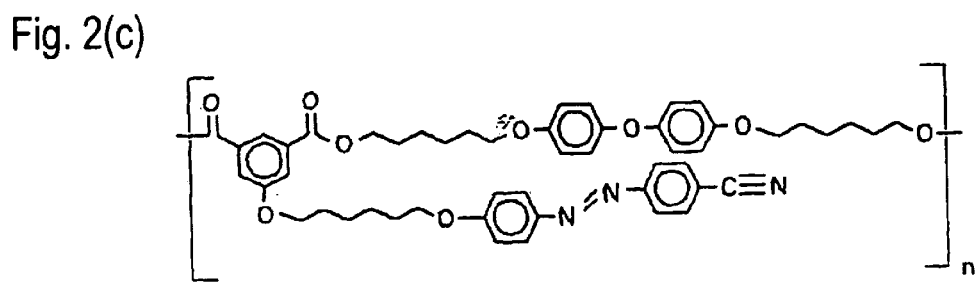

OPTICAL STORAGE MEDIUM, OPTICAL STORAGE METHOD; OPTICAL STORAGE APPARATUS, OPTICAL READING METHOD, OPTICAL READING APPARATUS, OPTICAL RETRIEVING METHOD AND OPTICAL RETRIEVING APPARATUS

This is a divisional application Ser. No. 09/056,798 filed Apr. 8, 1998, now U.S. Pat. No. 6,452,890.

BACKGROUND OF THE INVENTION

1. Field of the Invention

The present invention relates to a method and apparatus for storing data in an optical storage medium, reading the data from the optical storage medium, retrieving the data from the optical storage medium, and also relates to the optical storage medium used for such data storing, reading and retrieving.

2. Discussion of the Related Art

A rewritable optical disk such as a phase change disk or a magneto-optical disk has already used widely. The storing density of the optical disk is larger than that of a general magnetic disk by at least one digit. However, it is still insufficient for digital storage of image information. To enhance the storing density, it is necessary to reduce the beam spot diameter to shorten the distance to the adjacent track or bit.

A DVD-ROM is put into practice by such development of technique. The DVD-ROM with 12 cm diameter can store 4.7 GByte data on one side. A writable/erasable DVD-RAM with 12 cm diameter can realize high-density storage of 5.2 GByte data on both sides, which is more than 7 times as large as the capacity of a CD-ROM and corresponds to the capacity of more than 3,600 floppy disks.

The optical disk has been improved to obtain higher density and larger capacity from year to year. However, since the optical disk stores the data in the two-dimensional surface, the storing density is restricted by the light diffraction limit and is nearing 5 Gbit/cm$^2$. To obtain larger capacity, three-dimensional storage (volume holographic storage) further utilizing a depth direction is required.

Materials for the three-dimensional (volume holographic) optical storage medium are, for example, a photopolymer material, photoreactive material and the like. Since these materials change their refractive indexes by absorbing relatively week light beam, it is possible to use the change of the photo-induced refractive index for storing information. Therefore, these materials can be used for multiplexed holographic storage that realizes the larger capacity.

An example of high-density storage utilizing the photopolymer material is discussed in "SPIE Vol. 2514,355". Shift-multiplexed holograms are stored in a disk, that is made from DuPont's 150–100 photopolymer and rotated, using a spherical wave as a reference beam. As a result, the storing density of 10 times as large as that of a CD currently used, 10 bit/$\mu m^2$, is obtained.

An example of high-density storage using the photorefractive material is described in "OPTICAL ENGINEERING Vol. 34, 2193 (1995)". It is reported that 20,000-page holograms are multiple-stored in Fe-doped LiNbO$_3$ crystal of the size of 10×10×22 mm, and thereby about 1-GByte data storage is achieved.

The holographic memory can store the large capacity of data as described above, and in addition, it can write and read the pieces of data disposed two-dimensionally. Accordingly, it is possible to perform high-speed data storing, reading, retrieving, correlation detection and transfer by using the holographic memory. Specifically, the following data retrieving method is disclosed by Japanese Patent Application Laid-Open No. 3-149660 (1991).

FIG. 26 shows a device for retrieval. A laser 101 emits a laser beam to read pieces of two-dimensional retrieving object data holographically stored from an optical memory 102. A data pattern image is written to a spatial light modulator 103 of the optical address type. Two-dimensional retrieving data is written to a spatial light modulator 104 of the electric address type that is a liquid-crystal display (LCD) panel.

The spatial light modulator 104 is illuminated with a laser beam as a read beam from a laser 105 through an analyzer 106. The polarization state of the beam is changed in accordance with the retrieving data, and the light transmitted through the spatial light modulator 104 is reflected off a half-mirror prism 107. Then the light forms an image on a readout surface of the spatial light modulator 103 of the optical address type.

Thus, the polarization state of the read beam is modulated by the spatial light modulator 103 for each pixel in accordance with the retrieving object data The read beam illuminates a photodetecting array 109 through an analyzer 108, and the photodetecting array 109 performs batch detection as to whether there is any read beam transmitted through the pixels. Thus the batch detection of matching between bits of the retrieving object data and those of the retrieving data is possible.

"Conjugate Image Plane Correlator with Holographic Disk Memory", A. Kutanov and Y. Ichioka, OPTICAL REVIEW Vol. 1.3, No. 4, 1996, pp. 258–263 describes a data storage method and data correlation detecting method as follows.

FIG. 27 shows a device used in the storage method and correlation detecting method. In storing the data, two-dimensional data to be stored is displayed on a spatial light modulator 111 of the electric address type that is an LCD panel. A signal beam 112 having a two-dimensional amplitude modulation transmitted through the spatial light modulator 111 is Fourier transformed on a Fourier plane P1 by a lens 113 and illuminates an optical memory 114. At the same time, a reference beam 115 illuminates the optical memory 114 and the two-dimensional data is stored as a Fourier-transform hologram in the optical memory 114.

In detecting correlation, the two-dimensional retrieving data is displayed on the spatial light modulator 111 of the electric address type, and in addition, a read beam 116 having conjugate relation with the reference beam 115 used in storing illuminates the optical memory 114. The diffracted beam of the two-dimensional retrieving object data is read out from the hologram stored in the optical memory 114, and the diffracted beam is transformed on a Fourier plane P2 by the lens 113. Then the beam illuminates the spatial light modulator 111.

Accordingly, the transmitted beam from the spatial light modulator 111 is an optical product of the retrieving data and the retrieving object data. If the retrieving data and the retrieving object data match with each other, a strong correlation peak appears on a Fourier plane P3 through a lens 117. By detecting the peak, correlation between two-dimensional images can be found.

As an optical storage medium in which the hologram can be rewritten, an optical storage medium made of liquid crystal polymer is disclosed by Japanese. Patent Application Laid-Open No. 2-280116 (1990), and an optical storage medium made of a phase change material is disclosed by Japanese Patent Application Laid-Open No. 4-30192 (1991).

As described so far, attentions have recently been paid to the holographic memory to improve the memory capacity and processing speed, and the retrieving method discussed with reference to FIG. 26 and the storage method and the correlation detecting method discussed with reference to FIG. 27 have been proposed. Furthermore, enhancement of the signal-to-noise ratio (SIN) has been researched to realize high-density storage.

However, the conventional retrieving method, storage method and correlation detecting method explained with reference to FIGS. 26 and 27 have adopted a spatial light modulator of an amplitude (intensity) modulation type that is an LCD panel 104 or 111. Therefore, the following problems have been caused.

As shown in FIG. 28, like the spatial lightmodulators 104 and 111, an LCD for displaying data is constructed by forming a liquid crystal cell 124 containing a liquid crystal 121 and electrodes 122 and 123 on both sides of the liquid crystal 121 and disposing polarizers 126 and 127 on the outside of the liquid crystal cell. Dichromatic polarizers are used as the polarizers 126 and 127 because they can be downsized easily. However, since the transmittance of the dichromatic polarizer in the direction of transmission axis is as low as 70–80%, if two dichromatic polarizers are used together, 50% transmission loss is caused.

Therefore, in the case where data storing and reading are performed by utilizing the spatial light modulator that is an LCD panel, the light intensity is reduced in both of the storing and reading processes, and thereby SIN is also reduced. As a result, deterioration of hologram storing density or retrieving precision occurs. If the laser power is raised for increasing the signal intensity, a life span of the laser is shortened.

In storing and reading the data utilizing the holographic memory, there are the following noise factors which determine a bit error rate (BER):

(1) noises irrelevant to the quality of the hologram caused by a photodetecting array such as a CCD or the like;
(2) diffracted light from the adjacent hologram (crosstalk between pages);
(3) crosstalk between pixels in a reconstructed image; and
(4) fluctuation of diffraction efficiency in a single page or between pages caused by the defect of a crystal or optical system.

Information storage utilizing the amplitude (intensity) modulation is apt to be affected by various noises, and the storing density of the storage medium depends on the signal to the noise ratio (S/N). Therefore, several coding attempts have been made to restrict BER in the same way as other filing systems.

In the case where pieces of two-dimensional data having correspondence of [clear, dark] to [0, 1] are multiple-stored in holograms, a crosstalk resulting from the fluctuation of the diffraction efficiency occurs because the whole light intensity of the signal beam used in storing cannot be constant according to the data. To avoid the problem, a differential encoding method is adopted, in which [dark-clear] corresponds to [0], and [cleardark] corresponds to [1]. However, in this case, the coding ratio is 0.5, in other words, using efficiency of pixels is decreased.

As described above, if the spatial light modulator of the amplitude modulation type is employed to input data or retrieve data, some problems arise such as a low light using efficiency, deterioration of S/N, need for a special encoding, and so forth. Consequently, high-density storage, which is one of the characteristics of the holographic memory, cannot be sufficiently achieved in fact.

Moreover, the conventional data retrieving method explained with reference to FIG. 26 has problems in that:

(1) an expensive spatial light modulator 103 of the optical address type is required;
(2) a highly precise alignment of the spatial light modulator 103 of the optical address type and the spatial light modulator 104 of the electric address type is required;
(3) storage of a hologram in the optical memory 102 requires another spatial light modulator, and so forth.

The conventional storage method and correlation detecting method described with reference to FIG. 27 can avoid the above problems (1) to (3). However, since the detection of correlation between the data depends upon whether a correlation peak exists, a serious problem occurs. That is, it is impossible to detect matching between a bit of data and that of other data that are complex and of high-density, though a correlation value between pieces of data can be obtained. Therefore, these methods are not suitable for a computer filing system capable of retrieving.

It is possible to rewrite the hologram by using photo-refractive materials such as $Ba_2TiO_3$, $UNbO_3$, SBN ($Sr_xB_{1-x}Nb_2O_6$), or the liquid crystal polymeric material disclosed in Japanese Patent Application Laid-Open No. 2-280116 or the phase change material disclosed in Japanese Patent Application Laid-Open No. 4-30192.

However, the conventional optical storage medium and optical storage method using thereof, in principle, cause some changes in the materials in a portion of high light intensity, and in contrast, do not cause any change in the materials in a portion of low light intensity. Therefore, if it is desired to rewrite the data without an erasing process, a problem occurs. Suppose that, in a region, the content of the previously stored data causes changes in materials by high light intensity and the content of the new data does not cause changes in materials because of low light intensity. In the region, the content of the data that has caused changes in materials remains, and as a result, it is impossible to rewrite the data.

Consequently, when the data is to be rewritten, it is necessary to erase the previously stored data by an erasing process such as illuminating the whole surface of the optical storage medium with a laser beam and to write the new data It takes so much time to rewrite the data, and accordingly, high processing speed, that is one of advantages of the holographic memory, is lost.

SUMMARY OF THE INVENTION

The present invention has been made in view of the above circumstances and has an object to provide an optical storage apparatus and optical storage method using thereof which can perform high-density storing at high speed and can rewrite data at high speed without an erasing process.

Another object of the present invention is to provide an optical reading apparatus and optical reading method using thereof which can read out data stored in an optical storage medium with very high precision at high speed.

Further object of the present invention is to provide an optical retrieving apparatus and optical retrieving method using thereof which can retrieve a necessary piece of data with high precision at high speed from an optical storage medium in which a large amount of data is stored.

Further object of the present invention is to provide an optical storage medium suitable to high-speed storing, reading, retrieving data with high precision, and high speed rewriting of data without requiring an erasing process.

To achieve the objects and in accordance with the purpose of the invention, as embodied and broadly described herein, an optical storage medium of the present invention is a polarization-sensitive member that have a photo-induced birefringence property. The optical storage medium of the present invention may also be a sheetike light-transmitting material which has the polarization-sensitive member with the photo-induced birefringence property at least on one side as a layer.

The optical storage method of the present invention provides a signal beam that retains spatial polarization modulated data modulated by a spatial light modulator capable of modulating polarization of a light beam. The signal beam and a reference beam simultaneously illuminate an optical storage medium for storing a hologram of the polarization modulated data retained by the signal beam in the optical storage medium.

In the optical reading method of the present invention, a read beam illuminates an optical storage medium storing a hologram generated cooperatively by a reference beam and a signal beam retaining spatial polarization modulated data The data is then read out based on a polarization modulation of a diffracted beam from the hologram.

In the optical retrieving method of the present invention, a read beam illuminates an optical storage medium storing a hologram generated cooperatively by a reference beam and a signal beam retaining spatial polarization modulated data as retrieving object data. A diffracted beam from the hologram is transmitted through a spatial light modulator that modulates polarization of a light beam in accordance with retrieving data Matching between the retrieving object data and the retrieving data can be detected based on the polarization modulation of the transmitted diffracted beam.

In a conventional holography, a light intensity modulation based on an interference pattern of a signal beam and a reference beam is recorded as a change of a refractive index or an absorption in an optical storage medium. Accordingly, it is necessary that the polarizing directions of the signal beam and reference beam are in parallel. Amplitude and phase of the signal beam can be stored, but storage of polarizing direction is limited to only one direction. Therefore, in conventional holographic storage or data retrieval, a spatial light modulator of an amplitude modulation type has been used as described above.

In contrast, a material showing photo-induced birefringence (also referred to as photo-induced dichroism or photo-induced anisotropy) senses a polarization state of a light beam incident thereon, and is able to store a polarizing direction of the incident beam. As described later, inventors of the present invention have found materials having particularly excellent storage characteristics as a result of their researches and experiments.

Paying attention to the point, the present invention constructs an optical storage medium by making a sheet from a light-transmitting material and forming a polarization-sensitive layer having the photo-induced birefringence at least on one side of the sheet. Hereinafter, such optical storage medium according to the present invention is referred to as polarization-sensitive optical storage medium.

The polarization-sensitive optical storage medium can store a hologram generated by the photo-induced birefringence corresponding to the polarization modulation by an interference pattern of two light waves when the polarizing directions of the signal beam and reference beam are orthogonal to each other. In this specification, such hologram is referred to as polarization hologram in contrast with the hologram recorded by usual light intensity modulation. By illuminating the polarization hologram with a read beam having the same polarizing direction as that of the reference beam used in recording, a diffracted beam retaining the polarizing direction of the signal beam is available.

Paying attention to this point, the optical storage method is devised to obtain the signal beam retaining data information based on a spatial polarization modulation by a spatial light modulator capable of modulating polarization, illuminate the optical storage medium with the signal beam and reference beam at the same time, and thereby store the polarization modulation of the signal beam as a hologram in the optical storage medium. The optical reading method of the present invention illuminates the optical storage medium with a read beam, in which the signal beam retaining the data information based on the spatial polarization modulation is stored as the hologram by the reference beam, and thereby reads out the data information in accordance with the polarization modulation of the diffracted beam from the hologram.

Also, paying attention to the above point, the optical retrieving method according to the present invention illuminates the optical storage medium with the read beam, in which the signal beam retaining pieces of retrieving object data owing to the spatial polarization modulation is stored as the hologram by the reference beam. The diffracted beam from the hologram illuminates the spatial light modulator that modulates polarization in accordance with the retrieving data. Based on the polarization modulation of the light transmitted through the spatial light modulator, matching between the retrieving data and the retrieving object data is detected.

Since the spatial light modulator capable of modulating polarization can be constructed without a polarizer, there is no light transmission loss. Moreover, the signal beam retains the data information in the form of the spatial polarization modulation; therefore the light intensity modulation of the signal beam is constant. Consequently, the optical storage method according to the present invention can prevent the deterioration of S/N of the signal beam, and thereby can store the data with high precision at high speed.

Therefore, according to the optical storage method of the present invention, the data stored in the optical storage medium can be read out with high precision at high speed. The optical retrieving method of the present invention makes it possible to easily retrieve the required data from the optical storage medium that stores a large amount of data with high precision it high speed.

Furthermore; as described later, as a result of the research and experiments, the inventors of the present invention have found that, if data is stored as a polarization hologram in an optical storage medium by the optical storage method of the present invention, new data can be overwritten as another polarization hologram on the optical storage medium according to the optical storage method of the present invention without erasing the previously stored data by an erasing process such as radiation of laser beam over the whole surface of the optical storage medium.

Accordingly, the above-described optical storage method of the present invention enables high speed rewriting of data without an erasing process.

Additional objects and advantages of the invention will be set forth in part in the description which follows and in part will be obvious from the description, or may be learned by practice of the invention.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings:

FIGS. 1(a) and 1(b) are sectional views showing examples of an embodiment of an optical storage medium according to the present invention;

FIGS. 2(a), 2(b) and 2(c) are chemical formulas representing a transstructure of azobenzene, cis-structure of azobenzene, and a chemical structure of polyester polymer having cyanoazobenzene as a side chain, respectively;

DETAILED DESCRIPTION OF THE PREFERRED EMBODIMENTS

Figure 3A:
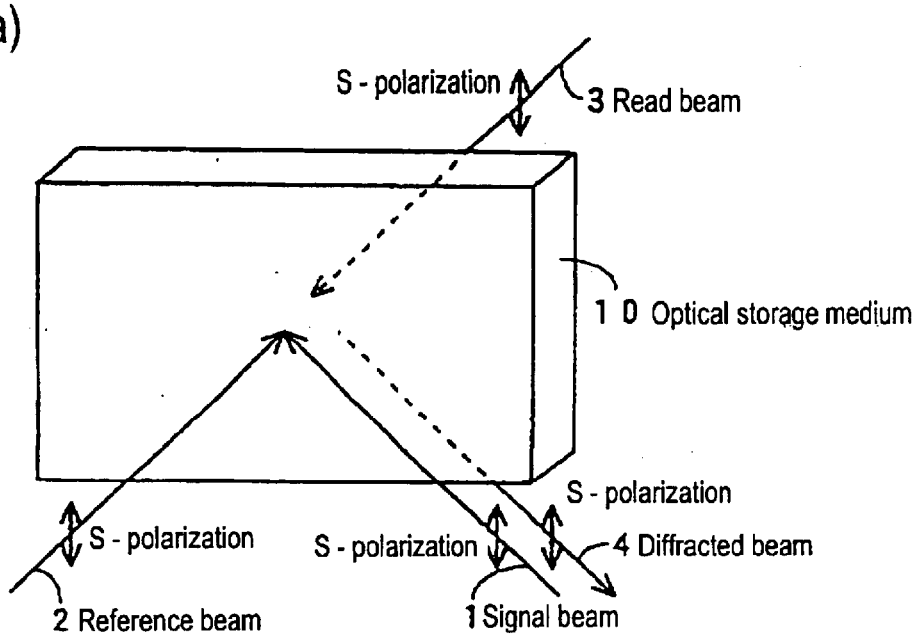
FIGS. 3(a) and 3(b) illustrate holograms based on a light intensity modulation and a polarization modulation, respectively.

Preferred embodiments are now described in detail based on the drawings.

First Embodiment

FIG. 1(a) shows an embodiment of an optical storage medium according to the present invention. On one side of a transparent substrate 11 such as a glass substrate, a polarization-sensitive layer 12 having photo-induced birefringence is formed to construct the polarization-sensitive optical storage medium 10. In this case, when data is stored, the polarization-sensitive layer 12 is illuminated with a signal beam 1 and reference beam 2 as shown in the figure.

To realize volume holographic storage (three-dimensional storage), the polarization-sensitive layer 12 is required to be at least about 10 $\mu$m in thickness and it is preferable to be thicker. If the layer 12 attains a thickness of 1 mm, a storing amount as much as about 100 CD-ROMs is available.

FIG. 1(b) shows another example of the optical storage medium according to the present invention. Here, the optical storage medium 10 as a whole is the polarization-sensitive layer 12. The thickness of the polarization-sensitive layer 12, namely, the thickness of the optical storage medium 10 is the same as that of the polarization-sensitive layer 12 shown in FIG. 1 (a).

In both cases shown in FIGS. 1(a) and 1 (b), the optical storage medium 10 is formed like a sheet, that is, the medium 10 is formed to have a sufficiently large area for its thickness. The optical storage medium 10 may be in the form of a disk.

Any material can be employed as the polarization-sensitive layer 12 as long as it has the photo-induced birefringence and able to record the polarization hologram. Preferred examples are, polymer or liquid crystal polymer having a photoisomarizable moiety as a side chain and polymer in which photoisomerizable molecules are dispersed. As the photoisomarizable moiety or molecule, those containing azobenzene structure are suitable.

Azobenzene shows trans-cis photoisomerization by illumination of In the trans-form, the molecular structure is shown as the chemical formula in FIG. 2(a). In the cis-form, the molecular structure is shown as the chemical formula in FIG. 2(b).

Due to such photoisomerization, there are relatively many trans-form azobenzene molecules before photo-excitation, and after the photo-excitation, there exist relatively many cis-form azobenzene molecules. Moreover, illumination of azobenzene with linearly polarized light gives a direction in photoisomerization, and thereby the direction appears in an absorption and refractive index. In general, these properties are referred to as photo-induced birefringence and photo-induced dichroism or photo-induced anisotropy. By illumination of the azobenzene with circularly-polarized light or non-polarized light, the excited anisotropy can be erased.

If a hologram is recorded in the optical storage medium whose polarization-sensitive layer 12 is made from polymer or liquid crystal polymer having azobenzene as a side chain, or polymer in which azobenzene molecules are dispersed, a signal beam 1 and reference beam 2, which are both coherent, illuminate the same region of the optical storage medium 10 simultaneously.

In this case, if the polarizing directions of the signal beam 1 and reference beam 2 are in parallel, for example, if both signal beam 1 and reference beam 2 are s-polarized as shown in FIG. 3(a), the light intensity modulation is generated in the optical storage medium 10 by the interference pattern of the signal beam 1 and reference beam 2. In a portion of high light intensity, azobenzene is strongly photo-excited; therefore a lot of cis-form azobenzene molecules are generated. In contrast, in a portion of low light intensity, there are small number of cis-form azobenzene molecules. Accordingly, a grating of the absorption or refractive index corresponding to the light intensity modulation is formed as a hologram.

Figure 3B:
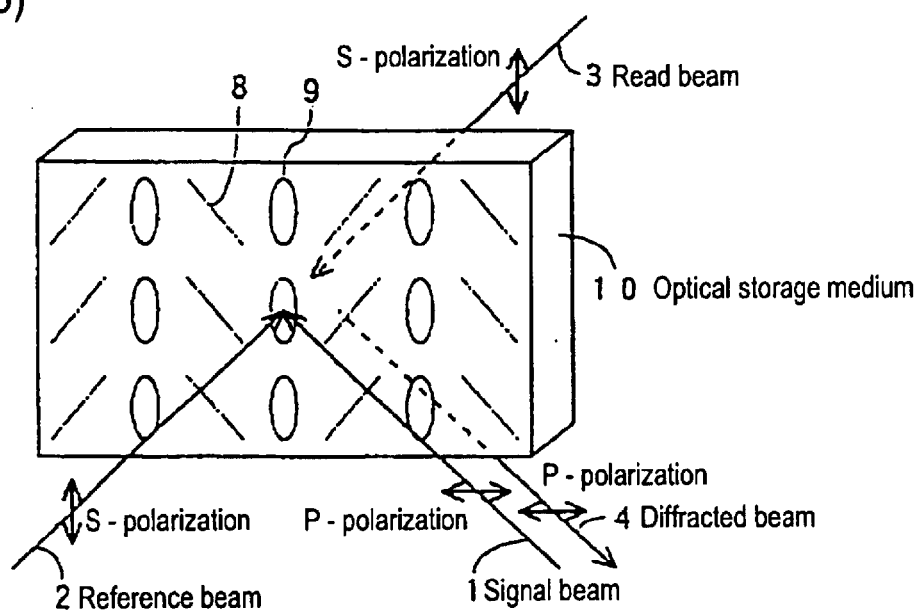

In contrast, suppose that the polarizing directions of the signal beam 1 and reference beam 2 are orthogonal to each other. If the signal beam 1 is polarized and the reference beam.2 is s-polarized as shown in FIG. 3(b), the same light intensity modulation does not occur as that in the case of parallel p-polarizing directions of the signal beam 1 and the reference beam 2. Instead, the polarizing directions are modulated spatially and periodically. Therefore, a linearly polarized portion 8 and elliptically polarized portion 9 periodically appear in turn.

In this case, the light intensity modulation is uniform. However, azobenzene molecules having the same direction with the modulated polarizing direction is strongly photo-excited than those having other directions. As a result, in the linearly polarized portion 8, many cis-form azobenzene molecules exist and a grating of the absorption or refractive index is formed as a hologram.

Hereinafter, the hologram based on the light intensity modulation in the case where the polarizing directions of the signal beam 1 and reference beam 2 are in parallel as shown in FIG. 3(a) is referred to as light intensity hologram, and the hologram based on the polarization modulation in the case where the polarizing directions of the signal beam 1 and reference beam 2 are orthogonal to each other as shown in FIG. 3(b) is referred to as polarization hologram.

By the use of polymer or liquid crystal polymer having azobenzene as a side chain or polymer in which azobenzene molecules are dispersed as the polarization-sensitive layer 12 of the optical storage medium 10, a hologram can be recorded since anisotropy of azobenzene is induced irrespective of whether the polarizing directions of the signal beam 1 and reference beam 2 are in parallel or orthogonal to each other.

As shown in FIG. 3(a) or 3(b), the optical storage medium 10 wherein the hologram has thus been recorded is illuminated with a phase conjugate beam of the reference beam 2 used in recording, namely, a light beam having the same wavefront but an opposite direction as the reference beam 2. Then a phase conjugate beam of the signal beam 1 used in recording, namely, a light beam with the same wavefront but an opposite direction as the signal beam 1, is generated as a diffracted beam 4 from the hologram.

In the case shown in FIG. 3(a), if both signal beam 1 and reference beam 2 are s-polarized, the recorded hologram is a light intensity hologram, namely, the hologram formed based on the light intensity modulation, and the diffracted beam 4 is also s-polarized. In the case where both signal beam 1 and reference beam 2 are p-polarized, the diffracted beam 4 is also p-polarized.

In contrast, if the signal beam 1 is p-polarized and the reference beam 2 is s-polarized as shown in FIG. 3(b), the recorded hologram is a polarization hologram, namely, the hologram formed based on the polarization modulation, and the diffracted beam 4 is p-polarized which is the same as the signal beam 1. If the signal beam 1 is s-polarized and the reference beam 2 is p-polarized, the diffracted beam 4 is s-polarized which is the same as the signal beam 1.

A case where the signal beam 1 has s-polarization component and p-polarization component is discussed as follows. It is assumed that the signal beam 1 is linearly polarized having equal s-polarization component and p-polarization component (polarizing directions is 45° from each of s-polarizing direction and p-polarizing direction). If the diffraction efficiencies of the light intensity hologram and the polarization hologram is equal, the read diffracted beam 4 has the same polarizing direction as the signal beam 1.

In contrast, if the diffraction efficiencies of the light intensity hologram and the polarization hologram is not equal, the polarizing direction of the read diffracted beam is different from that of the signal beam 1 because the diffraction efficiencies of the s-polarization and p-polarization are different from each other. However, a diffracted beam 4 having the same polarizing direction as the signal beam 1 is available by disposing a polarizer or a half-wave plate in an optical path of the diffracted beam 4.

As one of the preferred examples of the material of the polarization-sensitive layer 12, polyester polymer having azobenzene as a side chain represented by the chemical formula shown in FIG. 2(c) can be adopted. It is confirmed that the polarization hologram can be stored in the material by an optical system employing degenerate four-wave mixing shown in FIG. 4.

An argon ion laser radiating a laser beam suitable for polyester polymer having cyanoazobenzene as a side chain is used as a light source 91. The laser beam with 515 nm wavelength from the argon ion laser 91 is s-polarized perpendicular to the face of FIG. 4. Part of the laser beam is reflected off a half mirror 92a, transmitted through a shutter 93a, reflected off a mirror 94a, and transmitted through a half-wave plate 95 to obtain the signal beam 1. The polarizing direction of the signal beam 1 can be arbitrarily changed by the half-wave plate 95.

The signal beam 1 is transmitted through the half mirror 92b and illuminates a sample optical storage medium 10 made from polyester polymer having cyanoazobenzene as a side chain. At the same time, part of the laser beam transmitted through the half mirror 92a is reflected off a half mirror 92c, transmitted through a shutter 93b, reflected off a mirror 94b, and illuminates the optical storage medium 10 as the reference beam 2 of s-polarized. Here, a shutter 93c is closed.

When readout is performed, the shutters 93a and 93b are closed and the shutter 93c is open. The laser beam transmitted through the shutter 93c is reflected off the mirror 94c and illuminates the optical storage medium 10 as the s-polarized read beam 3. The diffracted beam 4 is reflected off the half mirror 92b and transmitted through an analyzer 96 to be fetched. The polarizing direction of the diffracted beam 4 can be analyzed by rotating the analyzer 96.

A hologram is recorded by the signal beam 1 of 4 mW-light power and approximately 100 μm-diameter and the reference beam 2 of 100 mW-light power and 2 mm-diameter. The time for recording is varied with five-second units. The hologram is read out after the storage has been completed. The light power of the read beam 3 is 200 mW. The illumination time of the read beam 3 for a single reading process is limited to 0.5 second in the fear of destruction of the hologram if the read beam 3 illuminates it for a long time.

Figure 5A:
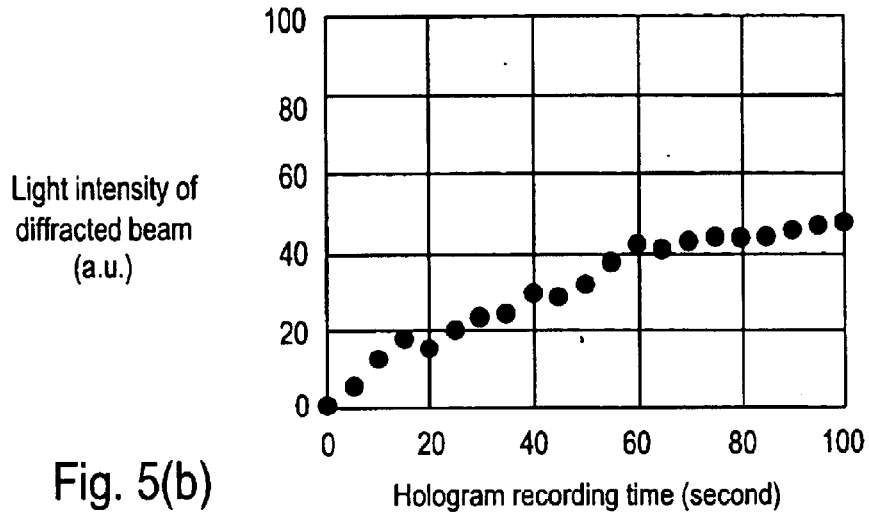
FIGS. 5(a), 5(b) and 5(c) show diffracted beam intensities corresponding to the time for recording a hologram in the cases where polarizing directions of a signal beam and reference beam are in parallel, orthogonal to each other and at an angle of 45°, respectively.
Figure 5B:
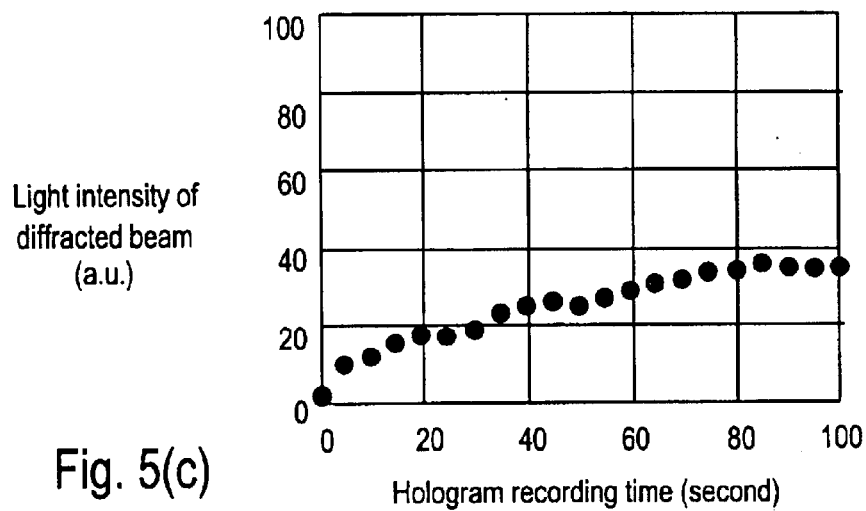
Figure 5C:
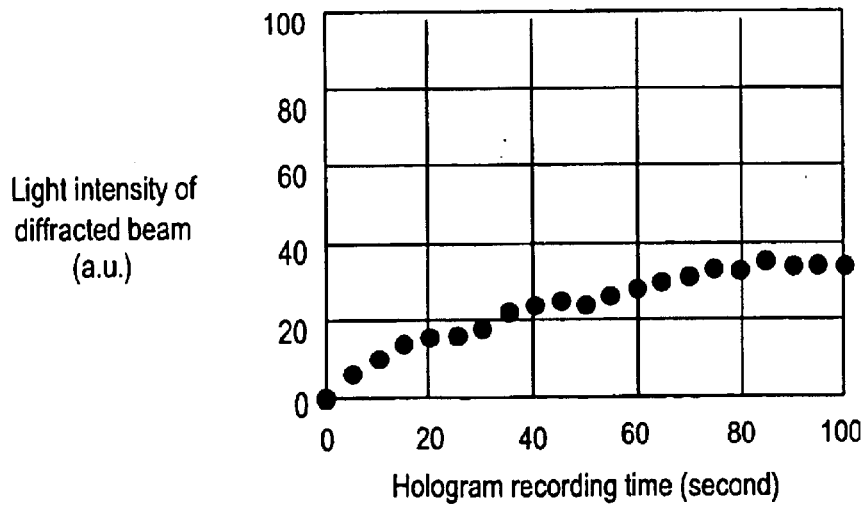

FIGS. 5(a), 5(b) and 5(c) show dependencies of the light intensity of the diffracted beam 4 in accordance with the time for recording the hologram in the cases where the signal beam 1 is s-polarized, p-polarized and 45°-polarized (the medium between the s-polarization and p-polarization). As described above, the reference beam 2 and the read beam 3 are s-polarized.

As it is clear from FIGS. 5(a), 5(b) and 5(c), the hologram can be recorded irrespective of the polarization state of the signal beam 1. It is also found from FIGS. 5(a), 5(b) and 5(c) that the light intensity of the diffracted beam 4 reaches a stationary state after the storage for approximately 80 seconds. Moreover, it is confirmed that the stored hologram can be maintained more than several months in a room temperature.

Figure 6:
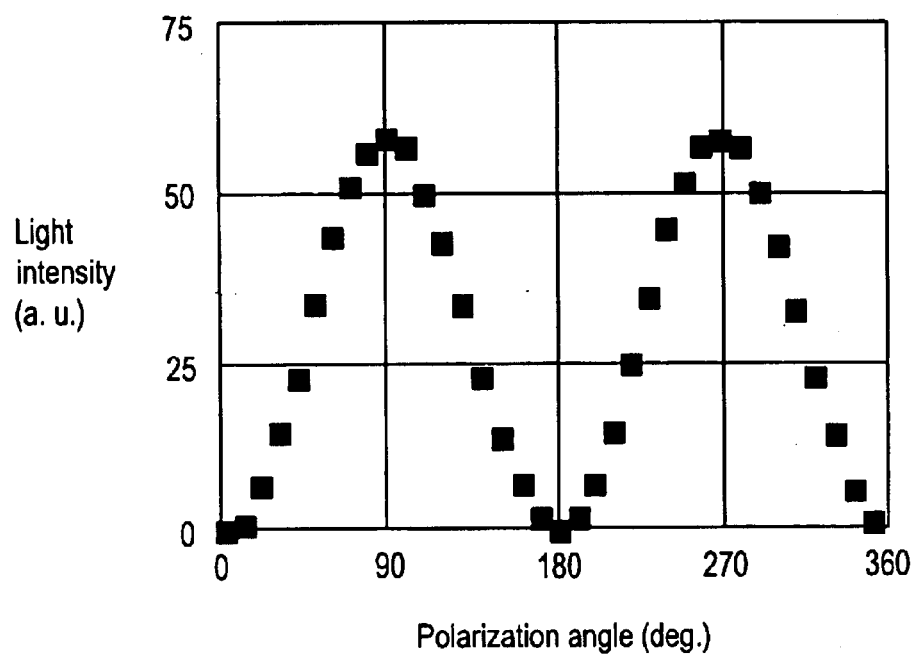
FIG. 6 shows a relationship between a polarizing direction of a diffracted beam and the light intensity in the case where the polarizing directions of the signal beam and reference beam are in parallel.

FIG. 6 shows the polarizing direction of the diffracted beam 4 if the signal beam 1 is s-polarized as shown in FIG. 5(a). The horizontal axis represents polarization rotating angle of the analyzer 96, in which points of 90° and 270° correspond to s-polarization. The vertical axis represents the transmission light intensity of the analyzer 96. From the figure, it can be found that the transmission light intensity takes the highest value at the polarization rotating angles of 90° and 270°. Accordingly, if the hologram recording is performed with the s-polarized signal beam 1, the diffracted beam 4 is also s-polarized.

Figure 7:
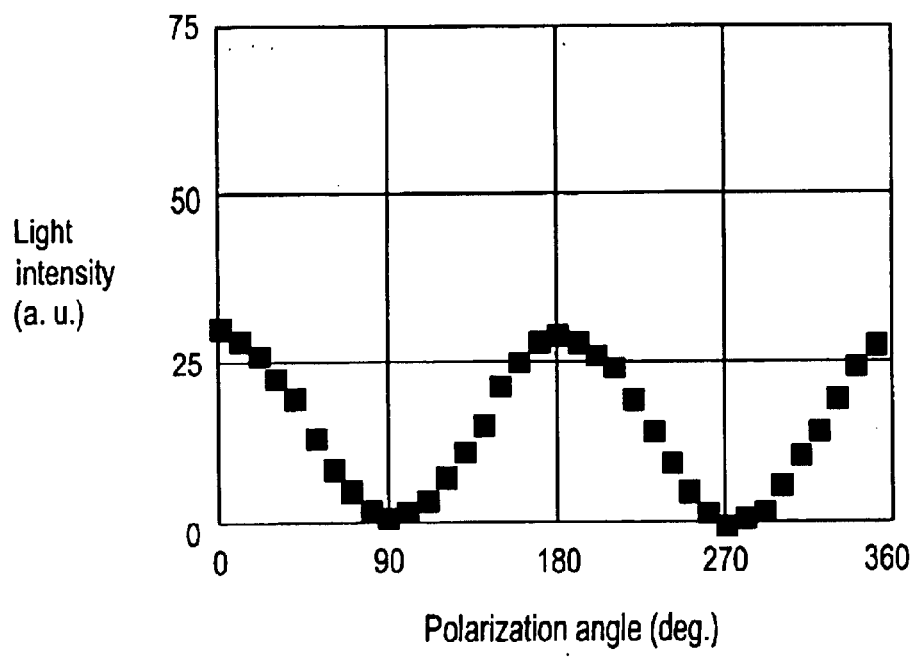
FIG. 7 shows a relationship between a polarizing direction of a diffracted beam and the light intensity in the case where the polarizing directions of the signal beam and reference beam are orthogonal to each other.

FIG. 7 shows the polarizing direction of the diffracted beam 4 if the signal beam 1 is p-polarized as shown in FIG. 5(b). The horizontal axis represents polarization rotating angle of the analyzer 96, in which points of 0° and 180° correspond to p-polarization. The vertical axis represents the transmission light intensity of the analyzer 96. From the figure, it can be found that the transmission light intensity takes the highest value at the polarization rotating angles of 0° and 180°. Accordingly, if the storage is performed with the p-polarized signal beam 1, the diffracted beam 4 is also p-polarized.

Figure 8:
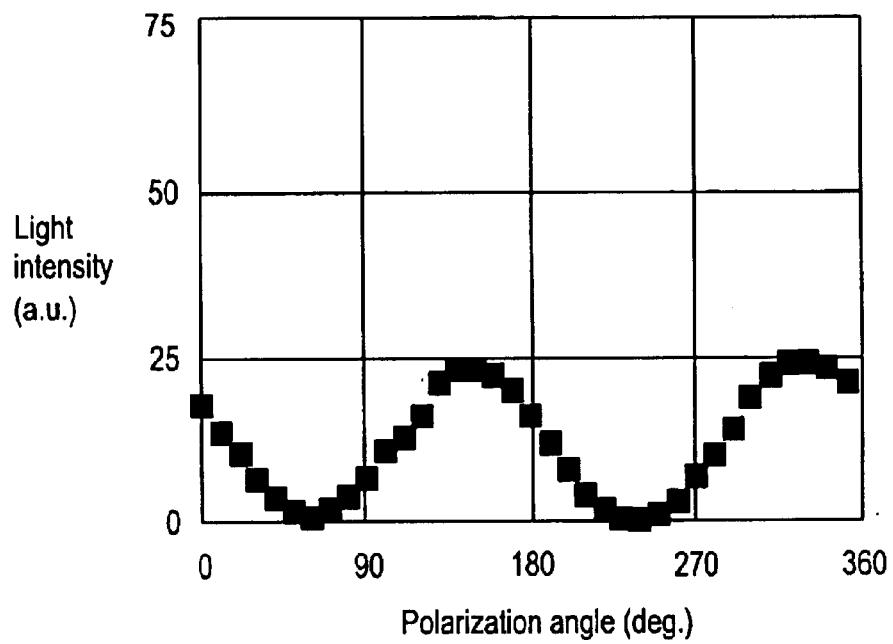
FIG. 8 shows a relationship between a polarizing direction of a diffracted beam and the light intensity in the case where the polarizing directions of the signal beam and reference beam are at a degree of 45°.

FIG. 8 shows the polarizing direction of the diffracted beam 4 if the signal beam 1 is 45°-polarized as shown in FIG. 5(c). The horizontal axis represents polarization rotating angle and the vertical axis represents the transmission light intensity of the analyzer 96. From the figure, it can be found that the transmission light intensity takes the highest value at the polarization rotating angles of 140° and 320°. Since the transmission light intensity of the analyzer 96 takes the highest value at the points of polarization rotating angles of 135° and 315° if the diffracted beam 4 is the phase conjugate beam that retains the polarization of the signal beam 1. Therefore, also in this case, it can be recognized that the diffracted beam 4 retains the polarization of the signal beam 1 for the most part.

The difference of 5°-polarization angle seems to be caused by the optical system, and in particular, by the polarization property of the half mirror 92b. The difference can be easily modified by providing the polarizer or half-wave plate in the optical path of the diffracted beam 4.

As a result, the optical storage medium made from polyester polymer having cyanoazobenzene as a side chain can store polarization of the signal beam as a hologram. It is also possible to read out the polarization of the diffracted beam from the optical storage medium. Accordingly, it is also possible to multiple-record the holograms each of which retains data information based on the intensity modulation or phase modulation on the same region of the optical storage medium made from polyester polymer having cyanoazobenzene as a side chain by changing the polarizing direction of the signal beam.

Figure 4:
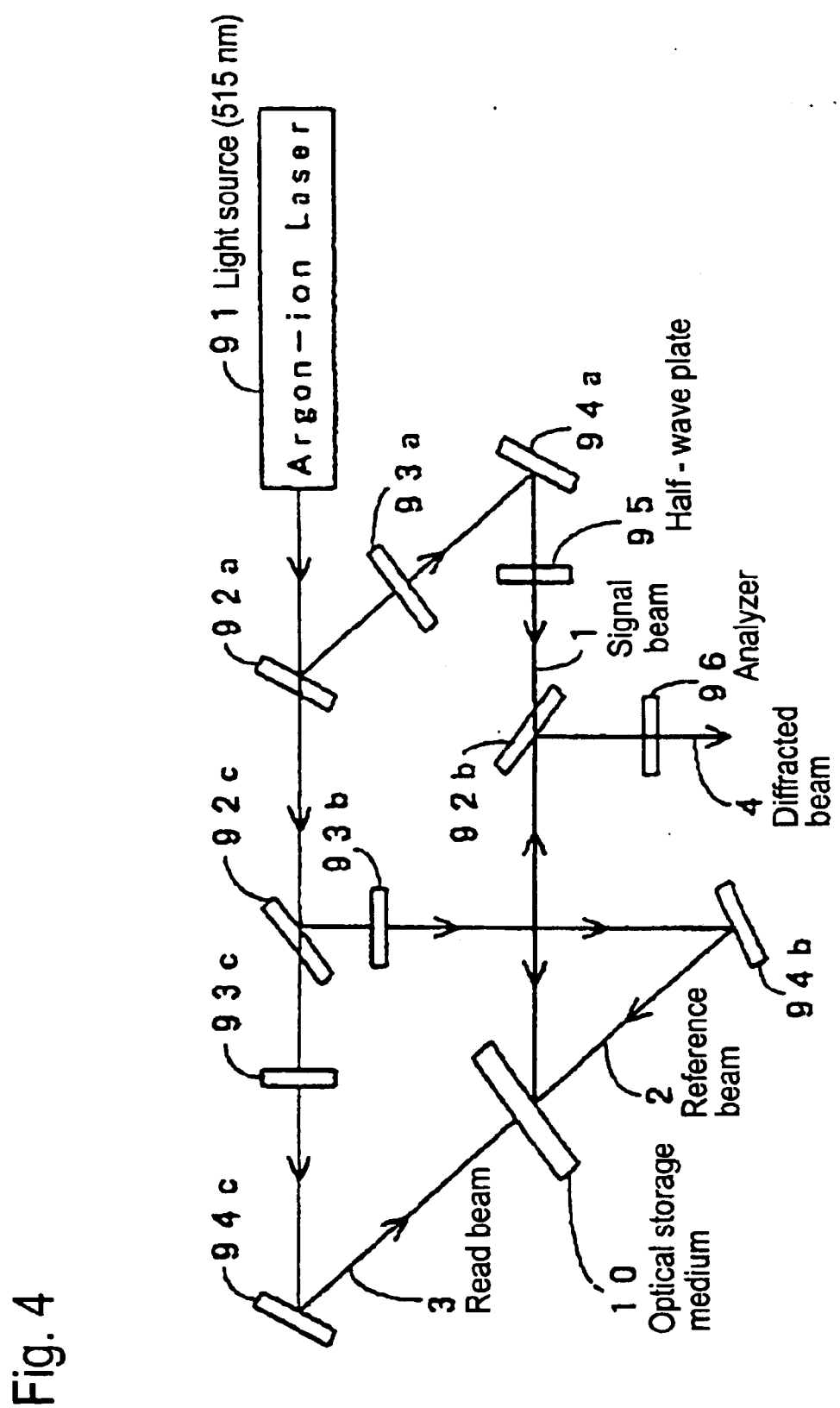
FIG. 4 is an optical system employing degenerate four-wave mixing used in an experiment.

Moreover, to examine whether it is possible to multiple-store holograms in the same region of the optical storage medium made from polyester polymer having cyanoazobenzene as a side chain by changing the polarization angle of the reference beam, holograms are recorded with various polarization angles of the reference beam 2 in the optical system shown in FIG. 4, and the polarization state of the diffracted beam 4 is examined. The polarization angle of the reference beam 2 is changed by the half-wave plate (not shown in FIG. 4) provided in the optical path of the reference beam 2.

Figure 9:
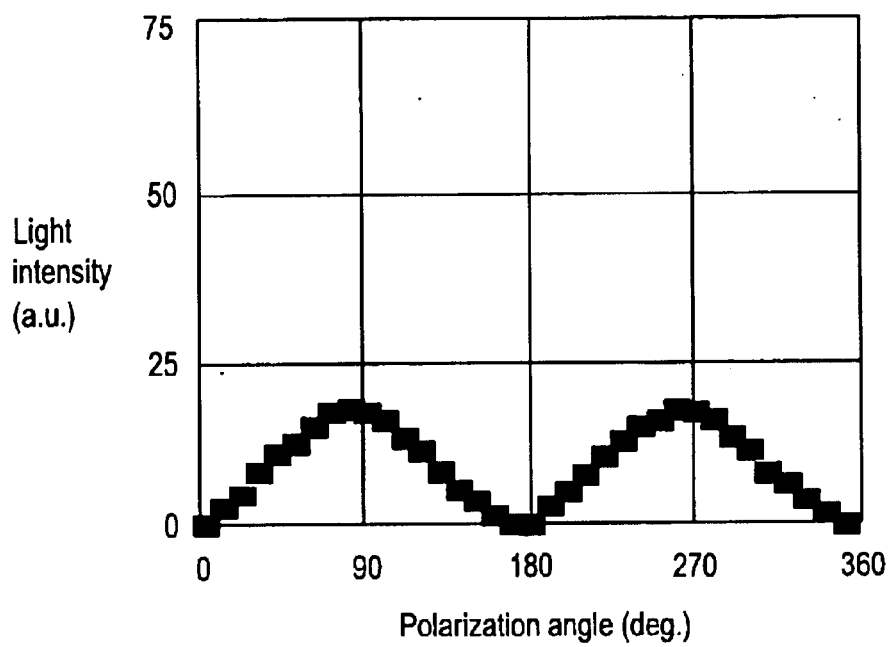
FIG. 9 illustrates polarization multiplexing based on rotation of the polarization angle of the reference beam.

FIG. 9 shows a relationship between the polarization angle of the diffracted beam 4 and the light intensity through analyzer in the case where the signal beam 1 is p-polarized, reference beam 2 is p-polarized, and the read beam 3 is s-polarized. The light intensity of the diffracted beam 4 marks a peak at the points of polarization angle of the diffracted beam 4 of approximate 90° or 270°. Therefore, it is found that the diffracted beam 4 is approximately s-polarized.

In contrast, as shown in FIG. 7 corresponding to FIG. 5(b), if the signal beam 1 is p-polarized, the reference beam 2 is s-polarized and the read beam is s-polarized, the diffracted beam 4 is p-polarized. As it is clear from the comparison of FIG. 7 with FIG. 9, if the hologram is recorded with rotation of the polarization angle of the reference beam 2, the polarization angle of the diffracted beam 4 rotates corresponding to the rotation of the polarization angle of the reference beam 4.

Therefore, it is possible to record multiple holograms, each of which retains data information based on the intensity modulation or phase modulation, on the same region of the optical storage medium made from polyester polymer having cyanoazobenzene as a side chain by rotating the polarization angle of the reference beam. The desirable diffracted beam from the polarization-multiplexed holograms recorded by the reference beams with the different polarizing directions can be separated by its polarization state.

Figure 10:
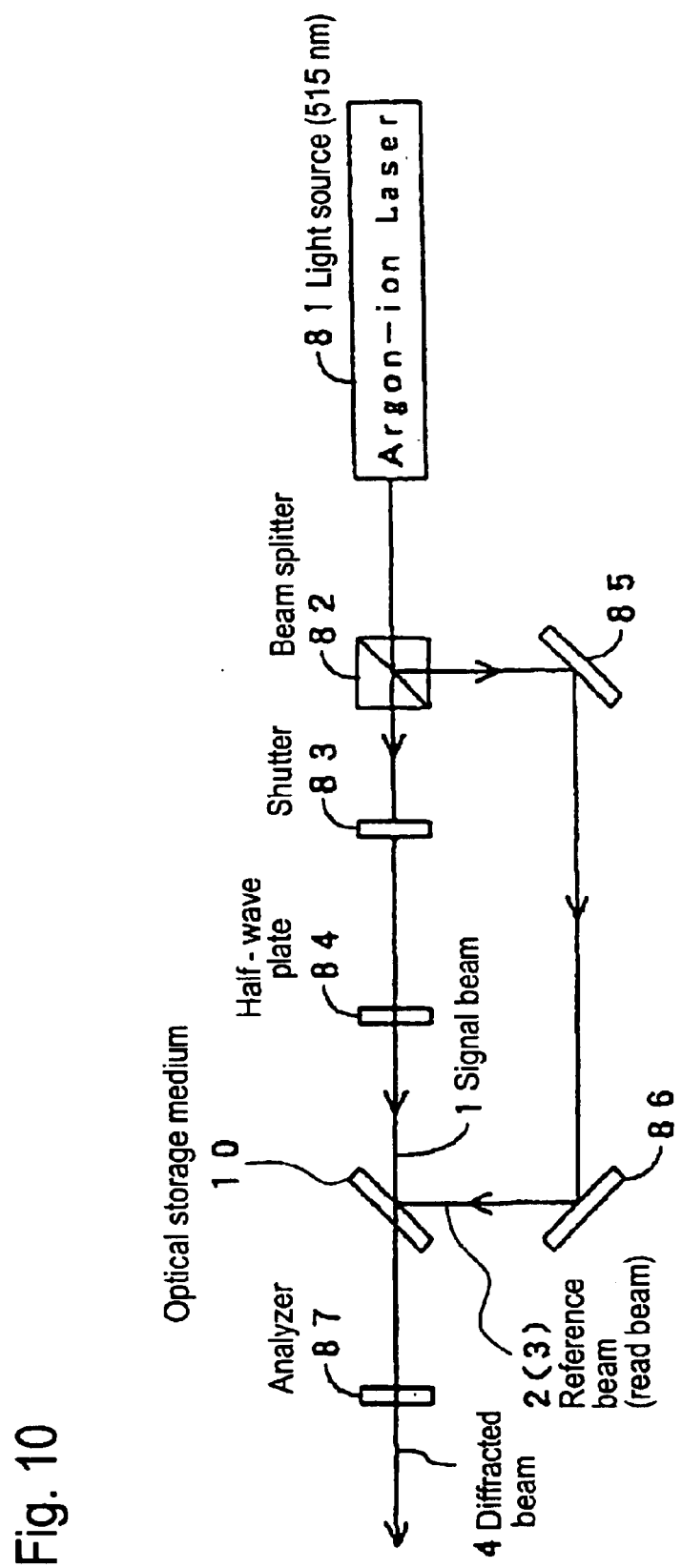
FIG. 10 shows an optical system for recording and reproducing the hologram used in an experiment.

The rewriting property of the optical storage medium 10 made from a polyester polymer having cyanobenzene as a side chain is measured by the optical system for storing and reproducing the hologram shown in FIG. 10.

As the light source 81, an argon ion laser that is the same as the light source 91 of the optical system of degenerate four-wave mixing in FIG. 4 is used. The laser beam with the wavelength of 515 nm from the argon ion laser 81 is s-polarized perpendicular to the face of FIG. 10. Part of the laser beam is transmitted through a beamsplitter 82, a shutter 83, and a half-wave plate 84 to obtain the signal beam 1. The polarizing direction of the signal beam 1 can be arbitrarily changed by the half-wave plate 84.

The signal beam 1 is incident on the sample optical storage medium 10 made from polyester polymer having cyanoazobenzene as a side chain. At the same time, the laser beam reflected off the beamsplitter 82 is further reflected off the mirrors 85 and 86 and illuminates the optical storage medium 10 as the s-polarized reference beam 2. Thus a hologram is recorded in the optical storage medium 10.

In readout process, the shutter 83 is closed and the laser beam reflected off the beamsplitter 82 is further reflected off the mirrors 85 and 86 and illuminates the optical storage medium 10 as the s-polarized read beam 3. The diffracted beam 4 is read from the optical storage medium 10 and transmitted through an analyzer 87 to be fetched. The polarizing direction of the diffracted beam 4 can be examined by rotating the analyzer 87.

At first, a hologram is stored for approximate 2 seconds by the signal beam 1 and the reference beam 2 with 1 W/cm$^2$ light intensities and about 2 mm diameters: Then the hologram is read by the read beam 3 with 0.1 W/cM$^2$ light intensity. After that the same recording and reading processes are repeated. The illumination time of the read beam 3 in a single reading process is limited to 0.5 second in the fear of destroying the stored hologram if the read beam 3 illuminates it for a long time.

Figure 11:
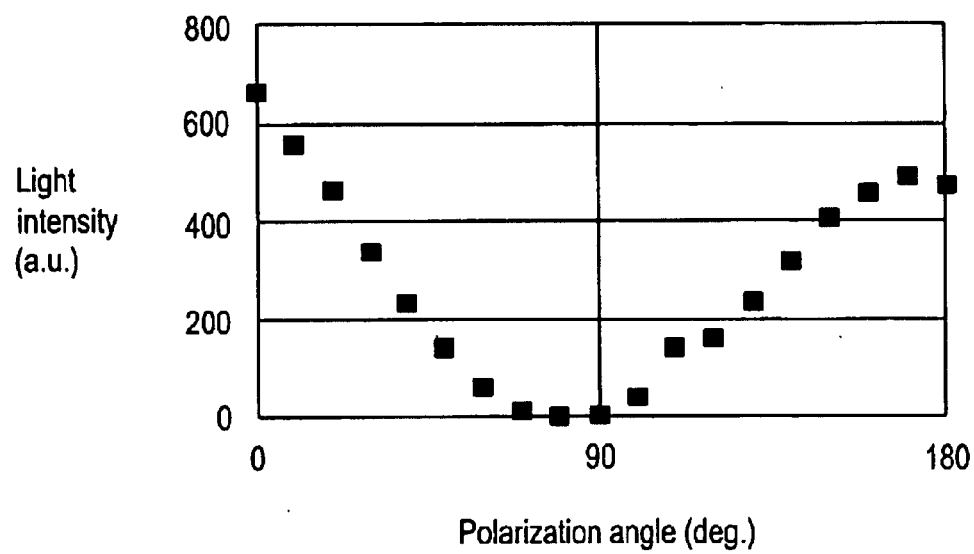
FIG. 11 shows a relationship between the light intensity and the polarization angle of the diffracted beam from a previously stored hologram in the case of rewriting.

FIG. 11 shows a result of examination of polarizing direction of the diffracted beam which has been read out. The horizontal axis represents the polarization rotation angle of the analyzer 87, where 0° and 180° correspond to s-polarization. The vertical axis represents the transmission light intensity of the analyzer 87. As described above, the signal beam 1, reference beam 2 and read beam 3 are s-polarized.

From FIG. 11 it is found that the transmission light intensity of the analyzer 87 becomes high at the points of the polarization rotation degree of the analyzer 87 of 0° and 170°. Accordingly, if a hologram is recorded by the s-polarized signal beam 1, the diffracted beam 4 is also s-polarized.

Next, in the region where s-polarized signal beam has been recorded as a hologram, p-polarized signal beam is overwritten without erasing the previously recorded hologram of s-polarized signal beam. In the optical storage system shown in FIG. 10, the signal beam 1 is changed to be p-polarized by rotating the half-wave plate 84 though the reference beam 2 remains to be s-polarized. Then the hologram is stored for approximate 4 seconds by the signal beam 1 and reference beam 2 with the same light intensities and beam diameters as the preceding experiment. The hologram is read by the read beam 3 with the same light intensity as the preceding experiment.

Figure 12:
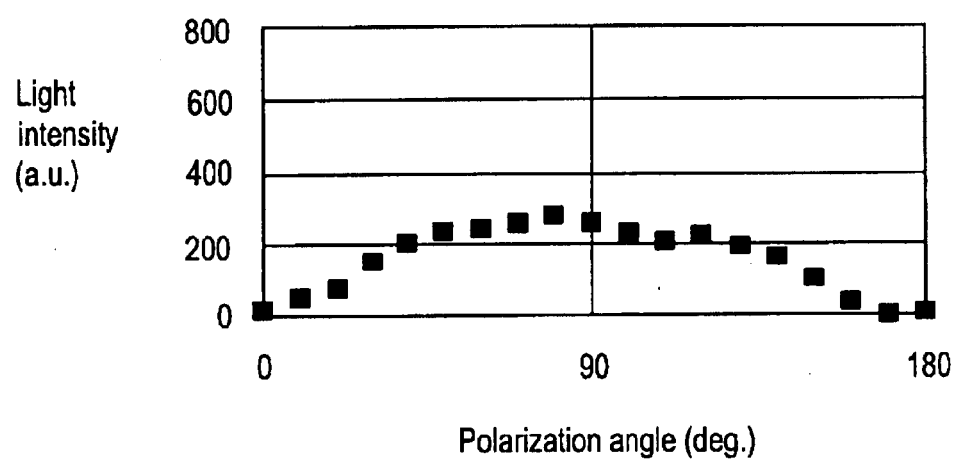
FIG. 12 shows a relationship between the light intensity and the polarization angle of the diffracted beam from a hologram stored later in the case of rewriting.

FIG. 12 shows the polarizing direction of the diffracted beam 4. The horizontal axis represents the polarization rotation angle of the analyzer 87 and the point of 90° corresponds to p-polarization. The vertical axis represents the transmission light intensity in the analyzer 87.

From the figure, the transmission light intensity through the analyzer 87 takes the highest value at the point of the polarization angle 80° of the analyzer 87. Therefore, if the p-polarized signal beam is stored in the region where the s-polarized signal beam has been stored without erasing the previously recorded hologram, the diffracted beam read from the region has p-polarized.

In contrast, if an s-polarized signal beam is recorded in a region where a p-polarized signal beam has been recorded without erasing the previously recorded hologram, it is confirmed that the diffracted beam read from the region has s-polarized (though not shown in the figure).

As a result of the above experiments, it is found that an s-polarized or p-polarized signal beam can be recorded in a region where an s-polarized or p-polarized signal beam has been recorded in advance without erasing the previously stored hologram. Moreover, there is no problem in overwriting the hologram again. Therefore any data can be rewritten at high speed without an erasing process.

To store the polarization of the signal beam as a hologram, to read it and to rewrite data without requiring an erasing process as described above are also available for an optical storage medium with a layer of polyester polymer having cyanoazobenzene as a side chain on only one side thereof. It is not limited to the optical storage medium using polyester polymer having cyanoazobenzene as a side chain, and these advantages are available for an optical storage medium equipped with a layer of polymer or liquid crystal polymer having a photoisomerizable moiety such as azobenzene as a side chain or of polymer in which photoisomerizable molecules such as azobenzene molecules are dispersed at least on one side thereof.

Second Embodiment

Figure 13:
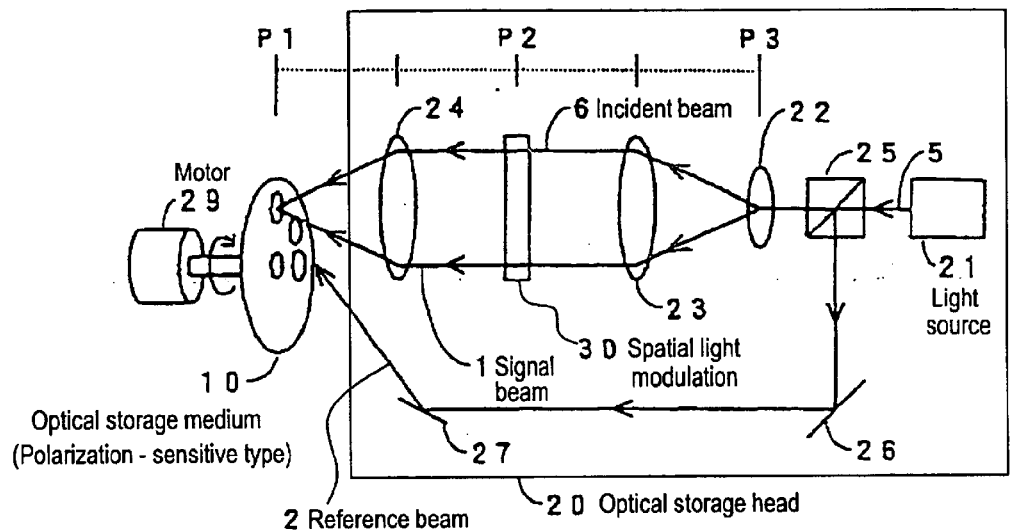
FIG. 13 shows an embodiment of an optical storage apparatus according to the present invention.
Figure 14:
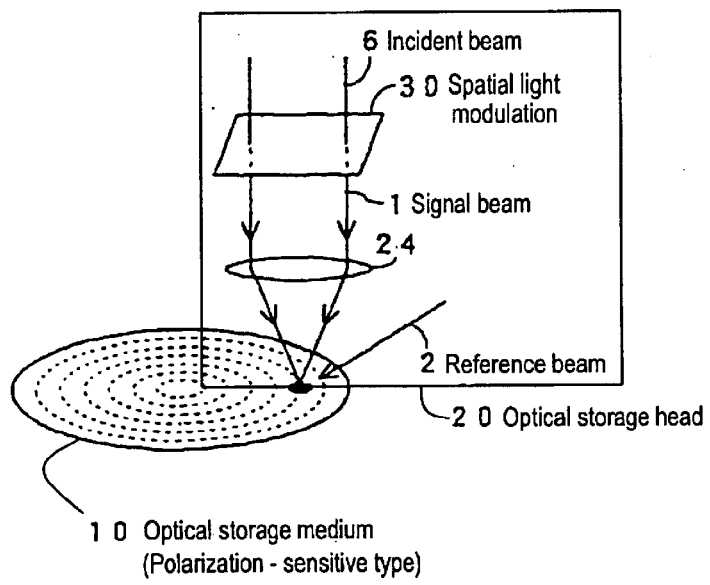
FIG. 14 illustrates formation of a recording track by using the optical storage apparatus shown in FIG. 13.

FIGS. 13 and 14 show an example of an optical storage method and optical storage apparatus. The optical storage medium 10 is of the polarization-sensitive type in the form of a disk described in the first embodiment As a light source 21 of an optical storage head 20, anything can be employed as long as it emits a coherent light beam that is suitable for the polarization-sensitive optical storage medium 10. In the case where the optical storage medium 10 is made from polyester polymer having cyanobenzene as a side chain, an argon ion laser can be used. The argon ion laser generates a laser beam of 515 nm wavelength as described above belonging to the wavelength with which cyanobenzene is photoisomerized. Part of the laser beam 5 from the light source 21 transmitted through a beamsplitter 25 and is adjusted to be a collimated beam by lenses 22 and 23 and illuminates a spatial light modulator 30.

Figure 28:
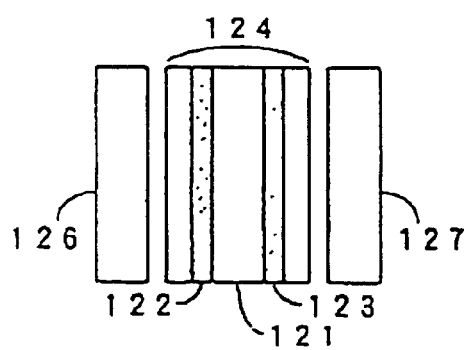
FIG. 28 shows a conventional spatial light modulator having the same configuration as an LCD.

The spatial light modulator 30 is capable of modulating polarization. As the spatial light modulator 30, a liquid crystal panel of the electric address type or an electro-optical crystal equipped with a matrix electrode can be used. Unlike the above-described spatial light modulator that is the LCD panel shown in FIG. 28, the spatial light modulator 30 in this embodiment does not have the polarizer.

Figure 15:
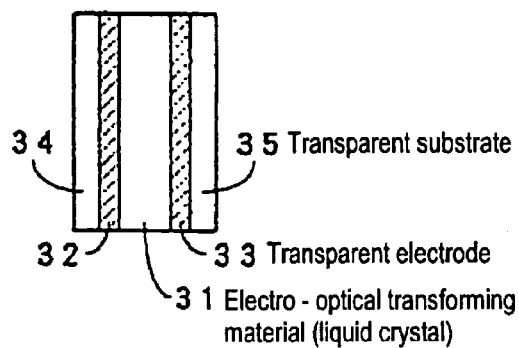
FIG. 15 shows an example of a spatial light modulator capable of modulating polarization used in the optical storage apparatus shown in FIG. 13.

FIG. 15 shows an example of the spatial light modulator 30 capable of modulating polarization. It is a spatial light modulator of light-valve configuration obtained by forming transparent electrodes 32 and 33 on inner surfaces of the transparent substrates 34 and 35, respectively, and then putting an electro-optical transforming material 31, such as liquid crystal, between the transparent electrodes 32 and 33. Multiple pixels are assigned functions as half-wave plates. Bit information of the two-dimensional data corresponding to each pixel is assigned as application or non-application of a voltage. Thereby the polarizing direction of a light beam incident on each pixel is modulated.

Figure 16:
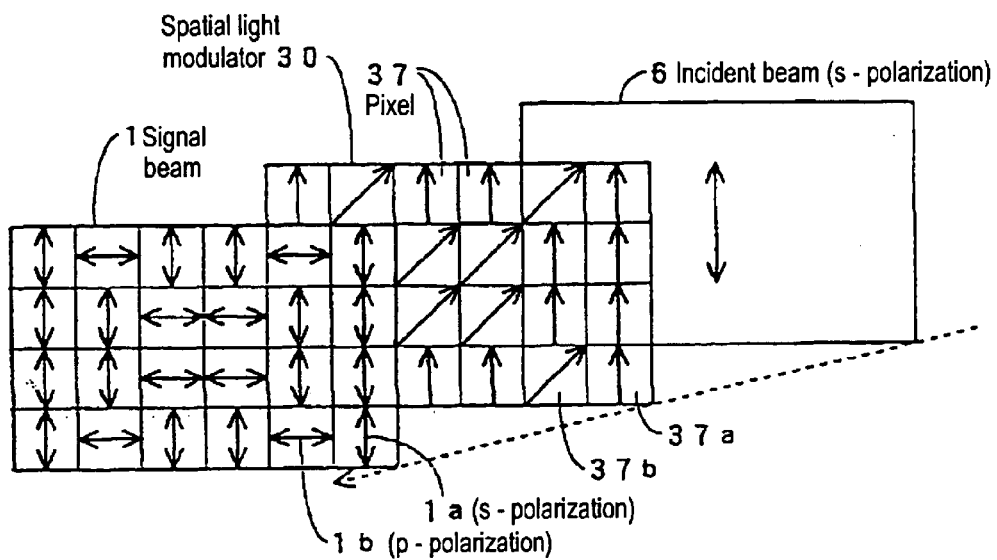
FIG. 16 illustrates a polarization modulation obtained by the optical storage apparatus shown in FIG. 13.

As shown in FIG. 16, the collimated beam 6 is incident on the spatial light modulator 30 as an s-polarized beam. The axis of the half-wave plate of a pixel 37a of the spatial light modulator 30, to which the voltage is not applied, is in parallel with the polarizing direction of the incident beam 6. Therefore, the signal beam 1a transmitted through the pixel 37a is s-polarized. In contrast, the axis of the half-wave plate of a pixel 37b of the spatial light modulator 30, to which the voltage is applied, rotates at 45° and thereby the polarizing direction of the incident beam 6 is rotated at 90°. Therefore, the signal beam 1b transmitted through the pixel 37b is p-polarized. Accordingly, the signal beam 1 transmitted through the spatial light modulator 30 has a spatial polarization modulation corresponding to the two-dimensional data.

As shown in FIGS. 13 and 14, the signal beam 1 transmitted through the spatial light modulator 30 is Fourier transformed on a Fourier plane P1 by a lens 24 and illuminates the optical storage medium 10. At the same time, the other part of the laser beam 5 from the light source 21 is reflected off the beamsplitter 25 and further reflected off mirrors 26 and 27 to obtain an s-polarized reference beam 2. The reference beam 2 illuminates the region of the optical storage medium 10 where the signal beam 1 illuminates. Thereby the polarization modulation of the signal beam 1 corresponding to the two-dimensional data can be stored as a polarization hologram in the optical storage medium 10.

Multiple polarization holograms can be recorded in different regions in the circumferential direction of the optical storage medium 10 by rotating the optical storage medium 10 by a motor 29. At this time, shift-multiplexing storage is possible if a spherical wave is used as the reference beam 2. Moreover, by moving the optical storage head 20 to the direction of diameter of the optical storage medium 10, the polarization hologram can be stored in the optical storage medium 10 as if concentric circular recording tracks are formed as shown in FIG. 14.

According to the optical storage method and optical storage apparatus described above, there is no loss of quantity of light in the spatial light modulator 30 because the spatial light modulator 30 does not have the polarizing plate. Moreover, since the signal beam 1 retains data information based on the spatial polarization modulation, the light intensity of the signal beam 1 is spatially uniform. Therefore, it is possible to prevent reduction of quantity of light in the spatial light modulator 30 or deterioration of the S/N of the signal beam 1 caused by fluctuation of the light intensity of the signal beam 1, and as a result, data can be stored with high density at high speed. Moreover, a special encoding is unnecessary.

Further, according to the optical storage method and optical storage apparatus as described above, the signal beam 1 transmitted through the spatial light modulator 30 has the spatial polarization modulation corresponding to the two-dimensional data. Either a beam of s-polarization or p-polarization always illuminates the storage region of the optical storage medium 10. Therefore, unlike the storage of the light intensity hologram, there is no portion where the light does not illuminate corresponding to the content of the two-dimensional data. In addition, a new polarizing direction can be overwritten without erasing the preceding polarizing direction as described above.

As described so far, according to the optical storage method and optical storage apparatus of this embodiment, data can be securely rewritten at high speed without an erasing process.

Third Embodiment

Figure 17:
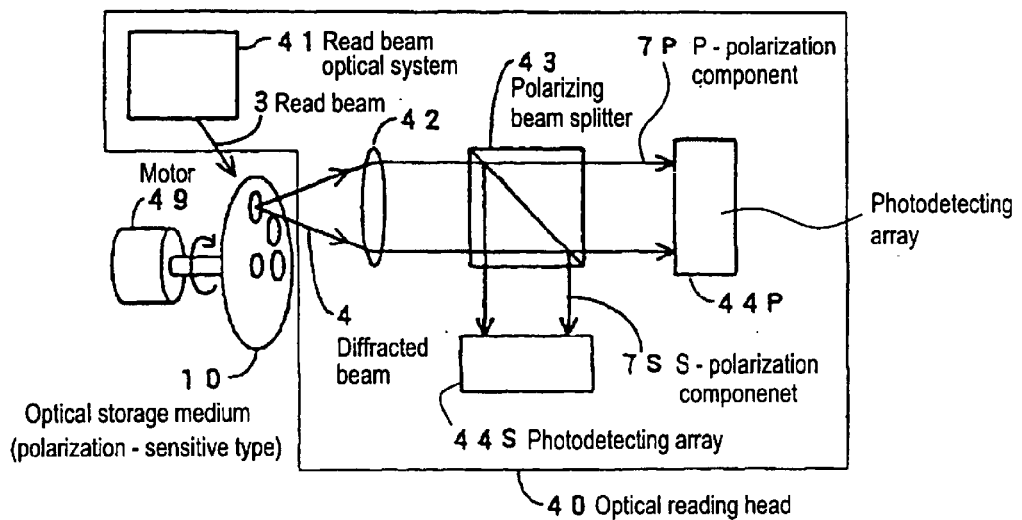
FIG. 17 shows an embodiment of an optical reading apparatus according to the present invention.

FIG. 17 shows an embodiment of an optical reading method and optical reading apparatus according to the present invention. The optical storage medium 10 is of the polarization-sensitive type in the form of a disk. In the optical storage medium 10, the signal beam 1 retaining the two-dimensional data based on the spatial polarization modulation is stored as a hologram as shown in FIG. 16 by the method and apparatus shown in FIGS. 13 through 16.

A phase conjugate beam of the reference beam used in storing is used as a read beam 3 by the read beam optical system 41 including a light source of an optical reading head 40. The beam illuminates the region of the optical storage medium 10 where the hologram has been recorded. Then a phase conjugate beam retaining polarizing direction of the signal beam used in storing can be obtained as a diffracted beam 4 from the hologram as shown in FIG. 18.

However, in this case, if the diffraction efficiencies of the light intensity hologram and the polarization hologram is not equal, the polarizing direction of the diffracted beam 4 is different from that of the signal beam 1. The diffracted beam 4 having the same polarizing direction as the signal beam 1 can be obtained by providing the polarizer or half-wave plate in the optical path of the diffracted beam 4.

The diffracted beam 4 is adjusted by a lens 42 to be a collimated beam and is then incident on the polarizing beamsplitter 43. Then the beam is separated into the s-polarization component 7S and p-polarization component 7P. The s-polarization component 7S is detected by a photodetecting array 44S or the p-polarization component 7P is detected by a photodetecting array 44P. A CCD or the like can be used as the photodetecting arrays 44S and 44P.

Figure 18:
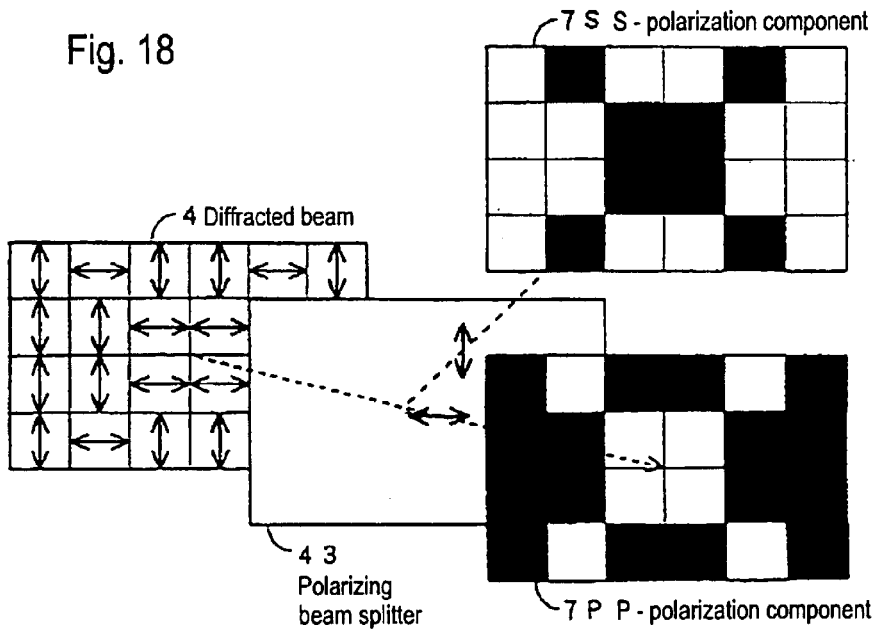
FIG. 18 illustrates a polarization modulation of a diffracted beam obtained by the optical reading apparatus shown in FIG. 17.

As shown in FIG. 18, the s-polarization component 7S and p-polarization component 7P are in the relation of a negative image and positive image. Therefore, by detecting one of them by the corresponding photodetecting array, two-dimensional data retained by the spatial polarization modulation of the diffracted beam 4, namely, two-dimensional data stored in the optical storage medium 10 can be read.

It is possible to read multiple holograms stored in different portions in a circumferential direction of the optical storage medium 10 by rotating the optical storage medium 10 by a motor 49. If the optical storage head 40 is moved to the diameter direction of the optical storage medium 10, the hologram can be read from the recording tracks formed as the concentric circles on the optical storage medium 10.

According to the optical reading method and optical reading apparatus of this embodiment, data stored in the optical storage medium 10 can be read with high precision at high speed. The diffracted beam 4, that is the phase conjugate beam of the signal beam, automatically cancels aberration or the like of the lens 42 in the optical path, and an image is automatically formed at a position of the focal distance point of the lens 42. Accordingly, there is no limitation to alignment.

Third Embodiment

Figure 19:
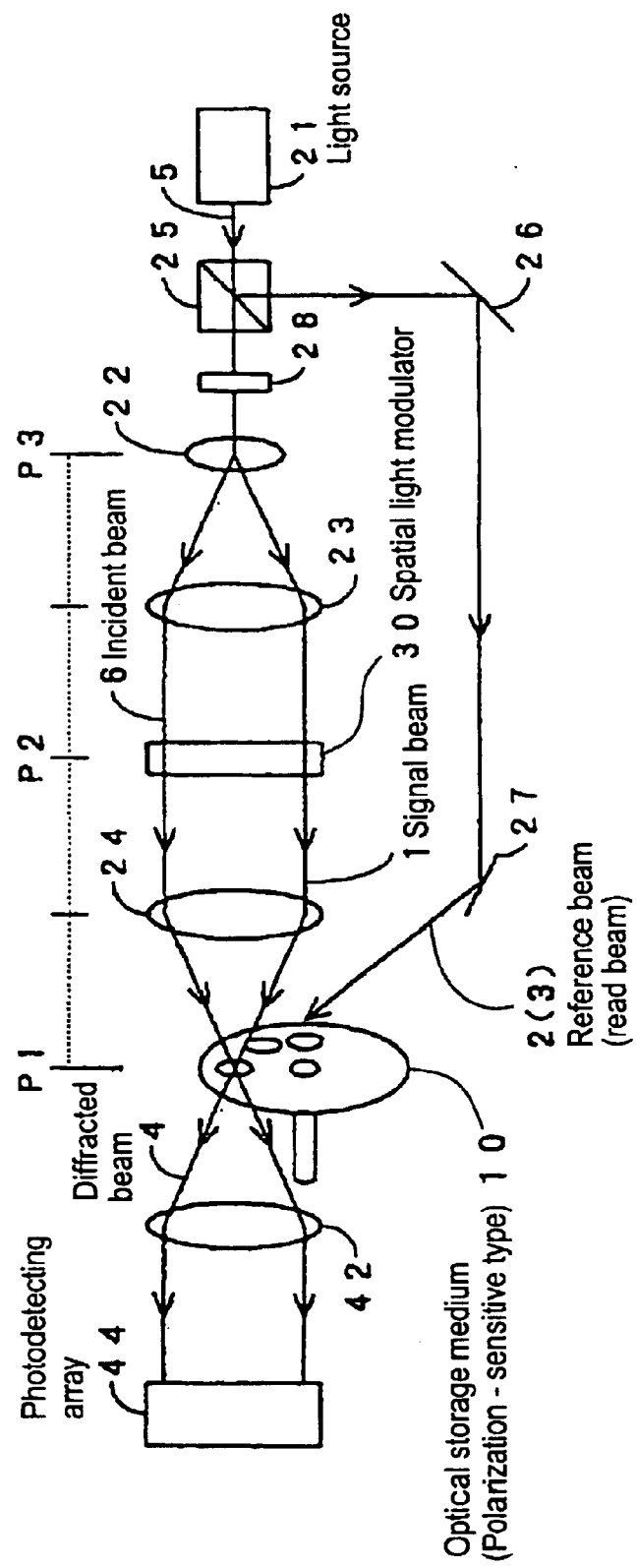
FIG. 19 shows another example of the optical storage apparatus and optical reading apparatus according to the present invention.

FIG. 19 shows another example of the optical storage method, optical storage apparatus, optical reading method and optical reading apparatus of the present invention.

The optical storage method and optical storage apparatus are to substantially the same as those shown in FIGS. 13 through 16 except that a shutter 28 is disposed to the optical path of the laser beam transmitted through the beamsplitter 25. The shutter 28 is opened in storing to obtain a parallel incident beam 6 and the signal beam 1 retaining the spatial polarization modulation.

In this example of the optical storage method and optical storage apparatus, data can be rewritten at high speed without requiring an erasing process as described above.

In this example of the optical reading method and optical reading apparatus, completely the same light beam as the reference beam 2 used in storing is used as the read beam 3, not the phase conjugate beam of the reference beam 2.

In reading, the shutter 28 is closed. The laser beam reflected off the beamsplitter 25 is further reflected off the mirrors 26 and 27 and illuminates the region of the optical storage medium 10 where the hologram has been recorded. Then a light beam retaining the polarizing direction of the signal beam used in storing can be obtained as the diffracted beam 4 from the hologram as shown in FIG. 18. The diffracted beam 4 is adjusted by the lens 42 to be the collimated beam and detected by the photodetecting array 44.

As shown in FIG. 17, the polarizing beamsplitter or wavelength plate can be provided between the lens 42 and photodetecting array 44, though not shown in FIG. 19. With this configuration, an s-polarization component and a p-polarization component in the diffracted beam 4 are separately detected.

Also in this example, data stored in the optical storage medium 10 can be read out with high precision at high speed.

Fourth Embodiment

In the optical reading method and optical reading apparatus shown in FIG. 17 (or. FIG. 19), the s-polarization component 7S and p-polarization component 7P of the diffracted beam are separated by the polarizing beamsplitter 43 and their light intensities are detected by the photodetecting arrays 44S and 44P. In this embodiment, the comparative operation is performed on the light intensities of the s-polarization component 7S and the p-polarization component 7P to cancel out noises caused by fluctuation of the diffracted beam 4, influence of the outer light, defects of the optical storage medium 10 or optical system, or the like. Thereby, a reading output with higher S/N is available.

Figure 20:
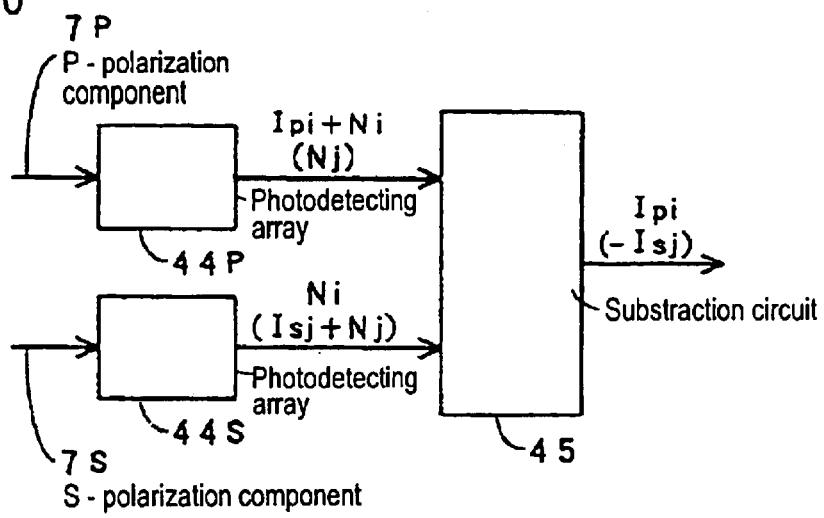
FIG. 20 illustrates a comparative operating method for increasing S/N of reading output.

FIG. 20 shows the method of comparative operation. In a subtraction circuit 45, the detecting output of the photodetecting array 44S is subtracted from the detecting output of the photodetecting array 44P for each corresponding pixel (bit).

It is assumed that the diffracted beam of the i-th order pixel is p-polarized, the signal component is Ipi, and the noise component is Ni. For the i-th order pixel, the output of the photodetecting array 44P is a sum of the signal component Ipi and the noise component Ni (Ipi+Ni), and the output of the photodetecting array 44S is only the noise component Ni. The output of the subtraction circuit 45 is only the signal component Ipi, as a result of cancellation of the noise component Ni.

It is assumed that the diffracted beam of the j-th order pixel is s-polarized, the signal component is Isj, and the noise component is Nj. For the j-th order pixel, the output of the photodetecting array 44P is only the noise component Nj, and the output of the photodetecting array 44S is a sum of the signal component Isj and the noise component Nj (Isj+Nj). The output of the subtraction circuit 45 is only the signal component—Isj as a result of cancellation of the noise component Nj.

In the case of readout of binary digital data, the positive output value of the subtraction circuit 45 may be determined as [1], and the negative output value may be determined as [0], for example.

Thus the noise can be canceled for each pixel according to the above-described optical reading method and optical reading apparatus. In addition, data value can be determined based on whether the output value is positive or negative compared to zero output value as the threshold without depending on the light intensity of the diffracted beam 4.

Fifth Embodiment

As described above, the polarization-sensitive optical storage medium of the present invention can record the polarization hologram, and further can record the hologram retaining data information based on the light intensity modulation or phase modulation on the same region as the polarization hologram has been stored by changing the polarizing direction of the signal beam.

Figure 21:
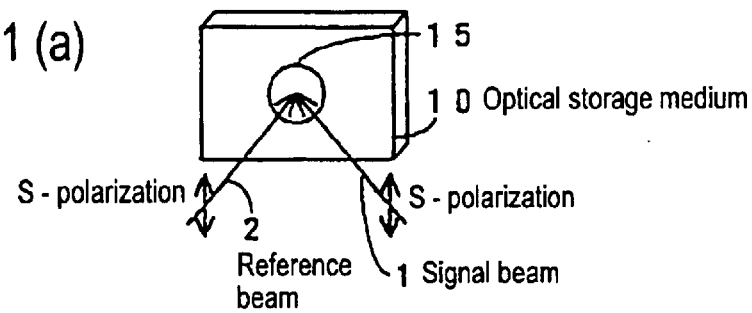
FIGS. 21 (a), 21 (b) and 21 (c) illustrate examples of multiplex hologram storage with rotation of polarization direction of the signal beam.

An example of the optical storage method and optical reading method in this case is discussed as follows. In the storing process at first, a hologram is recorded in a region 15 of the polarization-sensitive optical storage medium 10 with the signal beam 1 and reference beam 2. Both of the beams are s-polarized as shown in FIG. 21 (a). The hologram at this time is based on the light intensity modulation as described above with reference to FIG. 3(a).

Figure 21B:
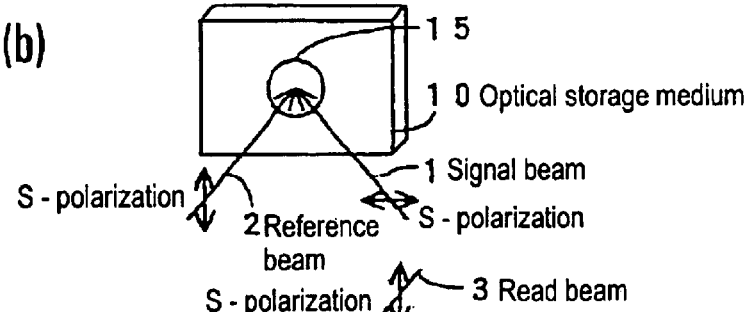

Next, as shown in FIG. 21(b), another hologram is recorded in the region 15 of the optical storage medium 10 with the signal beam 1 of p-polarization and reference beam 2 of s-polarization. The hologram is based on the polarization modulation as shown in FIG. 3(b). The order of storing the light intensity modulation hologram and the polarization hologram can be arbitrarily determined.

Figure 21C:
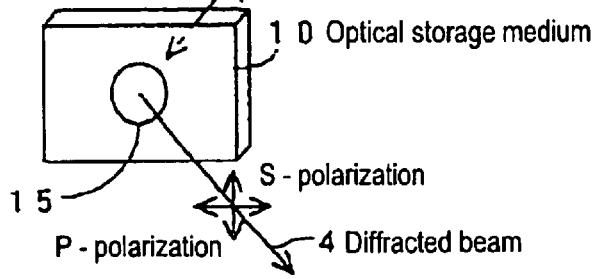

In the storing process, as shown in FIG. 21(c), the region 15 of the optical storage medium 10 where the light intensity hologram and polarization hologram are multiple-stored is illuminated with the read beam 3 which is the phase conjugate beam of the reference beam 2 used in storing. Thereby, the diffracted beam from the region 15 having s-polarization component diffracted from the light intensity hologram recorded by the signal beam of s-polarization and p-polarization component diffracted from the polarization hologram recorded by the signal beam of p-polarization.

As shown in FIGS. 17 and 18, the diffracted beam 4 is separated into the s-polarization component 7S and the p-polarization component 7P by the polarizing beamsplitter 43. The s-polarization component 7S is detected by the photodetecting array 44S, and the p-polarization component 7P is detected by the photodetecting array 44P. Accordingly, the light intensity hologram and polarization hologram, namely, data of the signal beam of s-polarization and data of the signal beam of p-polarization can be separated.

According to the above-described methods, holograms can be multiplexed in the same region and the multiplexed holograms can be separately read out from the same region. Thus storage of data with higher precision is available.

Sixth Embodiment

The polarization hologram diffracts a beam retaining the polarizing direction of the signal beam. Therefore, storage of a large amount of data information based on the different polarization angles is possible by rotating the polarization angle of the signal beam. Moreover, at the same time, it is possible to store a large amount of data information based on the different light intensifies by changing the light intensity of the signal beam. Thus the high-density storage is realized.

Figure 22:
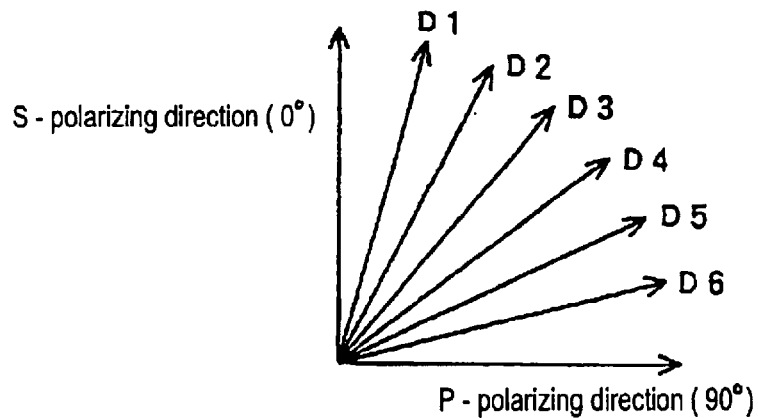
FIG. 22 illustrates data storage with rotation of the polarization angle of the signal beam.

For example, as shown in FIG. 22, six polarization angles represented by vectors D1–D6 are set within the range of 90° from s-polarizing direction (0°) to p-polarizing direction (90°). The six polarization angles can be coded to represent six kinds of bit. Therefore they can be represented as numbers corresponding to base 6 or numbers coded in the form of binary digit corresponding to 6th power. The lengths of vectors D1–D6 represent light intensities of the signal beam for each of the polarization angles. Multiple levels can be set to the lengths of vectors, and they are coded to represent plural bits.

The signal beam whose polarizing angle has been rotated is obtained by the spatial light modulator 30 shown in FIG. 13, 14 or 15. It can also be obtained by wave synthesis of the spatial intensity modulation of s-polarization and p-polarization by the beamsplitter.

Figure 23:
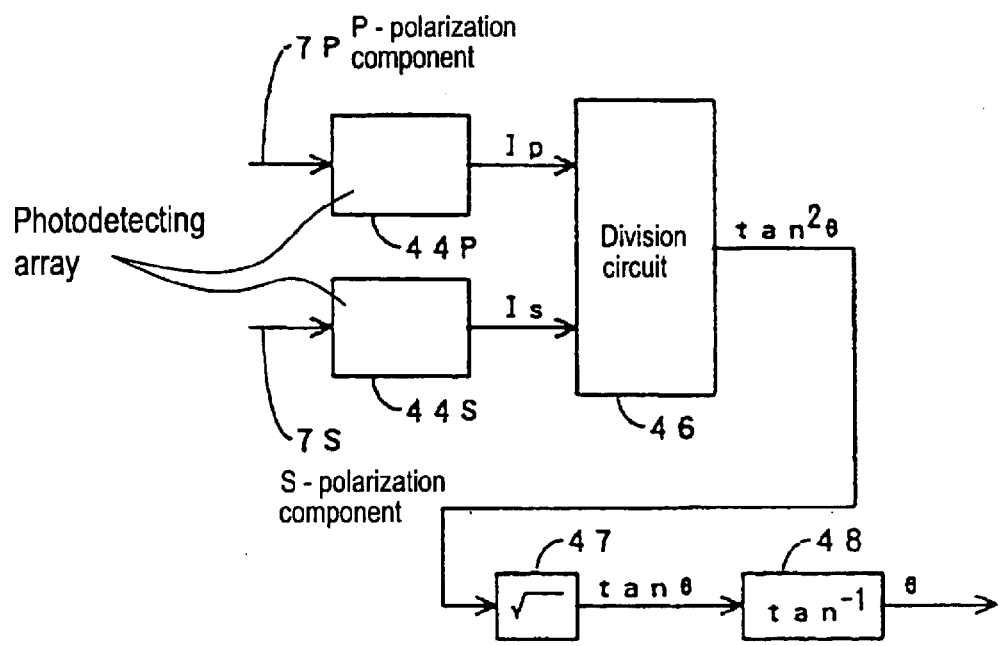
FIG. 23 illustrates the comparative operating method in reading in the case of data storage with rotation of the polarization angle of the signal beam.

In reading, as shown in FIGS. 17 and 18, the diffracted beam 4 from the hologram is separated into the s-polarization component 7S and p-polarization component 7P by the polarizing beamsplitter 43. The s-polarization component 7S is detected by the photodetecting array 44S and the p-polarization component 7P is detected by the photodetecting array 44P. Further, as shown in FIG. 23, the detection output of the photodetecting arrays 44S and 44P are provided to the comparative operation circuit including a division circuit 46, a square root detection circuit 47 and an arctangent calculating circuit 48 for performing comparative operation on each corresponding pixel (bit).

If it is assumed that the light intensity of the diffracted beam of a pixel is I, the polarization angle (s-polarizing direction is 0°) is θ, the intensity of the s-polarization component Is and the intensity of the p-polarization component Ip are represented as follows:

$$Is = I \cos^2 \theta \quad (1);$$

$$Ip = I \sin^2 \theta \quad (2).$$

Therefore, $\tan^2 \theta$ is obtained by dividing the p-polarization intensity by the s-polarization intensity Is by the division circuit 46. By the square root calculating circuit 47, $\tan \theta$ is obtained and polarization angle θ is obtained by the arctangent calculating circuit 48. Thus the data information based on the difference between the polarization angles of the signal beams can be read.

eventh Embodiment

Figure 24:
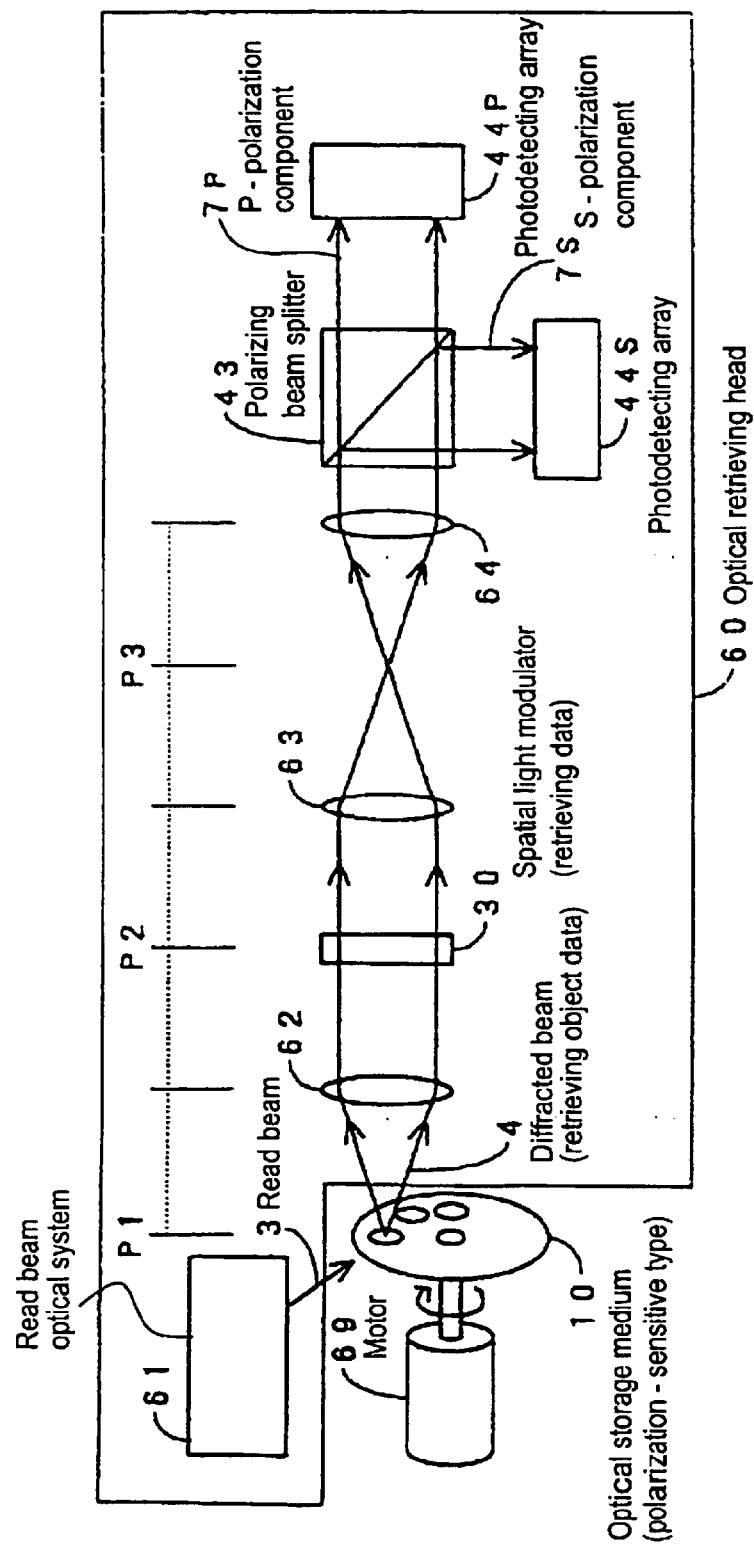
FIG. 24 shows an embodiment of an optical retrieving apparatus according to the present invention.

FIG. 24 shows an embodiment of the optical retrieving method and optical retrieving apparatus of the present invention. The optical storage medium 10 is of the polarization-sensitive type in the form of the disk The signal beam 1 retaining the two-dimensional retrieving object data based on the spatial polarization modulation as shown in FIG. 16 is stored as the hologram by the optical storage method and optical storage apparatus shown in FIGS. 16 to 19.

Figure 25:
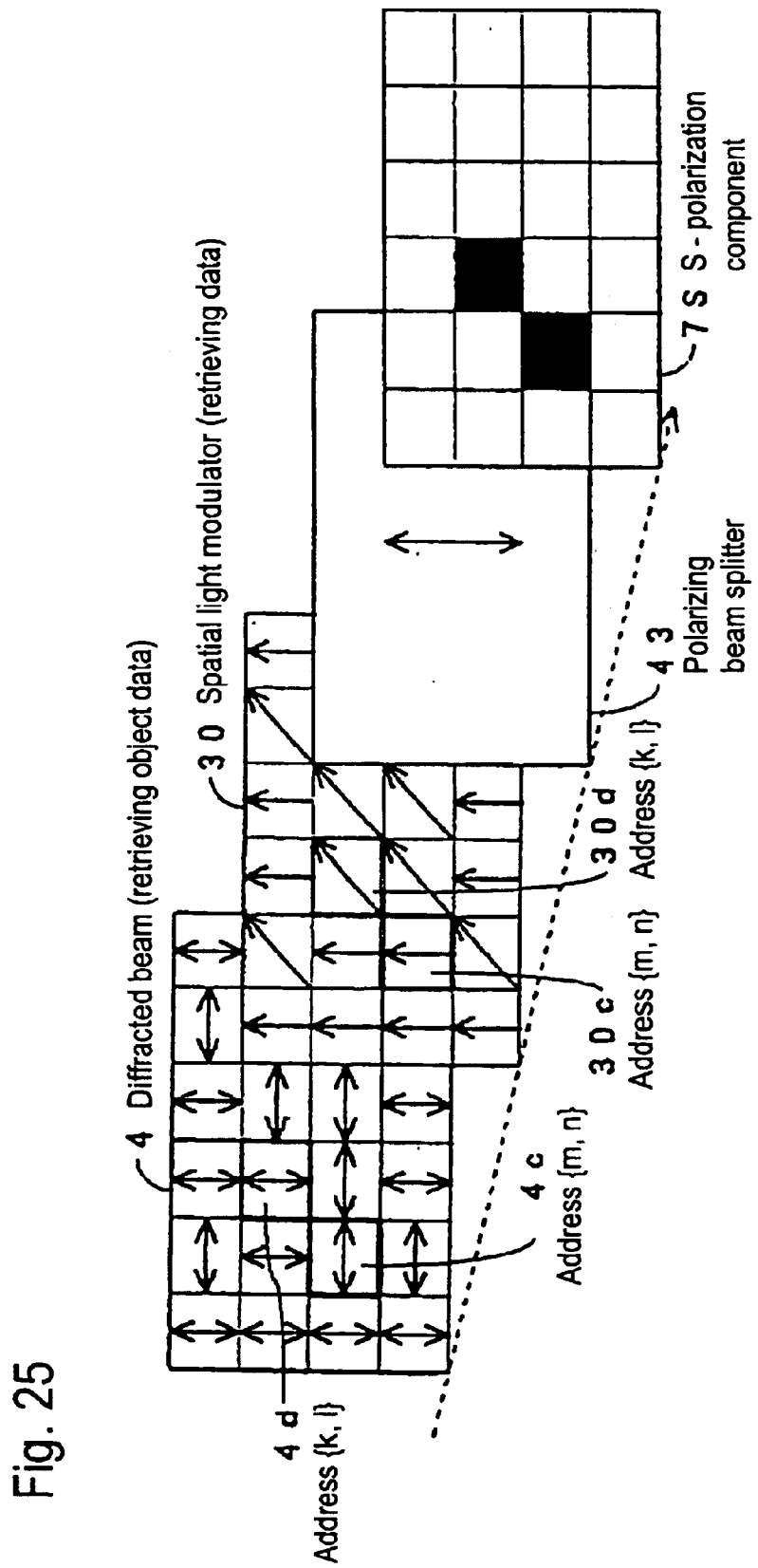
FIG. 25 illustrates retrieval of data by utilizing the optical retrieving apparatus shown in FIG. 24.
Figure 26:
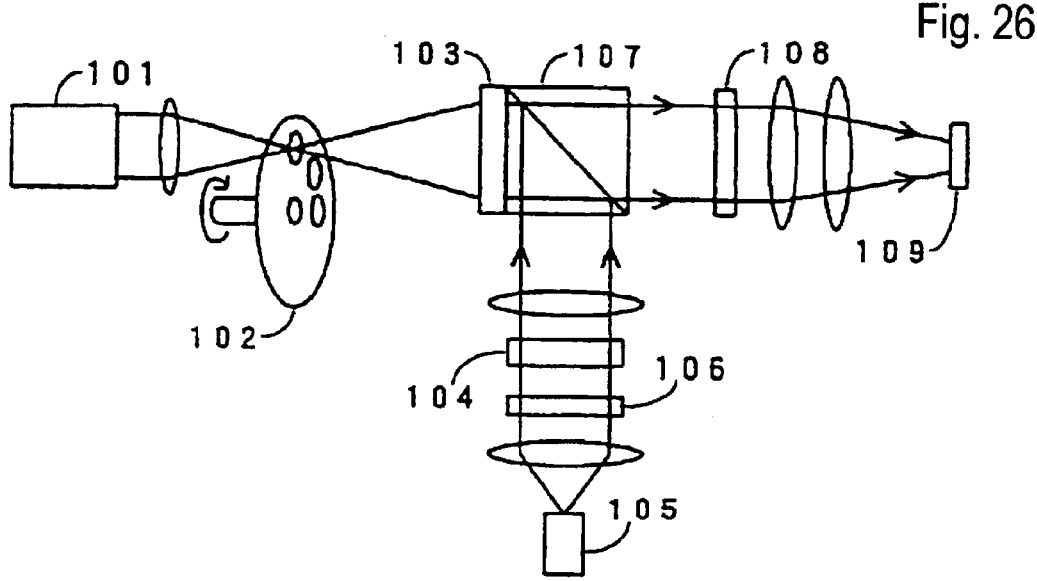
FIG. 26 shows a conventional retrieving apparatus.
Figure 27:
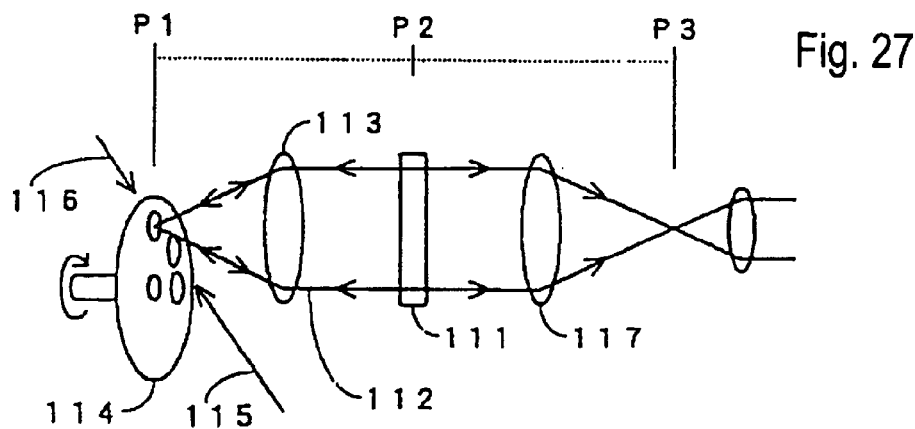
FIG. 27 shows a conventional storage apparatus and correlation detecting apparatus.

The spatial light modulator 30 as shown in FIGS. 13–15 or 19 is provided to the optical retrieving head (optical reading head) 60, and two-dimensional retrieving data is written thereto as shown in FIG. 25. In other words, bit information of the retrieving data corresponding to each pixel in the spatial light modulator 30 is provided to the pixel as application or non-application of the voltage. Each pixel functions as the half-wave plate to rotate the polarizing direction of a light beam incident thereon in accordance with the corresponding information bit of the retrieving data.

Similar to the optical reading method and optical reading apparatus shown in FIG. 17, the phase conjugate beam of the reference beam used in recording is obtained as the read beam 3 from the read beam optical system 61 of the optical retrieving head 60 including the light source, and the read beam 3 illuminates the region of the optical storage medium 10 where the hologram has been recorded. As a result, the phase conjugate beam retaining the polarizing direction of the signal beam used in storing is obtained as the diffracted beam 4 from the hologram as shown in FIG. 25.

The diffracted beam 4 is converted into the collimated beam by a lens 62 and forms an image on the spatial light modulator 30. The converted diffracted beam transmitted through the spatial light modulator 30 is further transmitted through lenses 63 and 64 which constitute an imaging optical system. The beam is then incident on the polarizing beamsplitter 43 and is separated into the s-polarization component 7S and p-polarization component 7P. The s-polarization component 7S is detected by the photodetecting array 44S and the p-polarization component 7P is detected by the photodetecting 45 array 44P.

In this case, plural holograms stored in different places in circumferential direction of the optical storage medium 10 are read by rotating the optical storage medium 10 by the motor 69. The holograms recorded in the recording track in the form of the concentric circles on the optical storage medium 10 are read by moving the optical retrieving head 60 to the direction of diameter of the optical storage medium 10.

The diffracted beam 4 retaining the polarization information of the retrieving object data is the phase conjugate beam retaining the polarizing direction of the signal beam used in storing. Consequently, if the retrieving data and the retrieving object data completely match with each other, the diffracted beam transmitted through the spatial light modulator 30 is s-polarized for all pixels owing to a phase modification operation by the phase conjugate beam in that a distortion of a wavefront is canceled by passing through a phase distortion medium twice. Therefore, s-polarization component 7S separated by the polarizing beamsplitter 43 is [clear] for all pixels, and p-polarization component 7P is [dark] for all pixels.

In contrast, if the retrieving data and the retrieving object data do not match with each other, the phase modification operation of the phase conjugate beam does not work. Accordingly, the diffracted beam transmitted through the spatial light modulator 30 is p-polarized in the pixel.

It is possible to detect whether the retrieving data and retrieving object data completely match with each other, or correlation value between the retrieving data and retrieving object data by monitoring all intensities of the so polarization component 7S or p-polarization component 7P of the detection output of the photodetecting array 44S or the photodetecting array 44P. The comparative operation on all intensities of the s-polarization component 7S and p-polarization component 7P cancels the noises. Accordingly, the correlation value between the data or matching between the data can be detected with higher precision.

It is assumed that the retrieving data and retrieving object data do not match with each other. For example, as shown in FIG. 25, the address {m, n} of the retrieving data is s-polarized (0°-rotation of the axis of the half-wave plate of the address {m, n} 30c of the spatial light modulator 30), and the address {m, n} of the retrieving object data is p-polarized. In this case, the diffracted beam 4 in the address {m, n} becomes p-polarized by passing through the address {m, n} 30c of the spatial light modulator 30.

If the address {k, l} of the retrieving data is p-polarized (45°-rotation of the axis of the half-wave plate of the address {k, l} 30d of the spatial light modulator 30) and the address {k, l} of the retrieving object data is s-polarized, the diffracted beam 4 in the address {k, l} becomes p-polarized by passing through the address {k l} 30d of the spatial light modulator 30.

In other words, the diffracted beam transmitted through the spatial light modulator 30 is s-polarized where the retrieving data and the retrieving object data match with each other, and p-polarized where the retrieving data and the retrieving object data do not match with each other. Accordingly, the s-polarization component 73S separated by the polarizing beamsplitter 43 is [dark] in an address where the retrieving data and the retrieving object data do not match with each other. In contrast, the p-polarization component 73P is [clear] in an address where the retrieving data and the retrieving object data do not match with each other.

Therefore, clearness or darkness in each address of the s-polarization component 7S or p-polarization component 7P is detected from the detection output of the photodetecting array 44S or photodetecting array 44P; accordingly, whether the retrieving data and the retrieving object data match with each other or not can be detected for each address (bit). In the same way as the optical reading method and optical reading apparatus shown in FIG. 17, the comparative operation on the light intensities of the s-polarization component 7S and p-polarization component 7P is performed as shown in FIG. 20, thereby the noise is canceled and it becomes possible to detect matching between the data with higher precision.

According to the optical retrieving method and optical retrieving apparatus, in the state where the retrieving data is written in the spatial light modulator 30 in the optical retrieving head 60, the optical retrieving head 60 4 can be moved to the recording track formed as the concentric circles on the optical storage medium 10 and the optical storage medium is rotated by the motor 69. Thereby only two-dimensional data that matches with the retrieving data can be retrieved from the optical storage medium 10 accumulating a large a amount of data with high precision at high speed. Moreover, the retrieving data can be set easily and arbitrarily. Therefore, desired data can be easily retrieved.

What is claimed is:

1. An optical storage medium comprising a polarization-sensitive member having a photo-induced birefringence property, wherein information in a form of at least one light intensity hologram and at least one polarization hologram is multiplexingly stored by the optical storage medium, the at least one light intensity hologram and the at least one polarization hologram produced by a same reference beam and a signal beam that is polarization modulated by a spatial light modulator to simultaneously record the at least one light intensity hologram and the at least one polarization hologram as gratings, the at least one light intensity hologram being generated by a signal beam and a reference beam with a polarization direction of the signal beam in parallel with a polarization direction of the reference beam, and the at least one polarization hologram produced by the signal beam and the reference beam with the polarization direction of the signal beam perpendicular to the polarization direction of the reference beam.

2. The optical storage medium as set forth in claim 1, further comprising a light transmitting substrate, wherein the polarization-sensitive member is formed on at least one side of the substrate as a layer.

3. The optical storage medium as set forth in claim 1, wherein the polarization-sensitive member comprising at least one element selected from the group consisting of a polymer having a photoisomerizable moiety as a side chain and a liquid crystal polymer.

4. The optical storage medium as set forth in claim 3, wherein the photoisomerizable moiety includes azobenzene structure.

5. The optical storage medium as set forth in claim 3, wherein one of the polymer and the liquid crystal polymer is a polyester polymer.

6. The optical storage medium as set forth in claim 1, wherein the polarization-sensitive member comprising a polymer and photoisomerizable molecules disperse therein.

7. The optical storage medium as set forth in claim 1, wherein the substrate is in a form a disk.

* * * * *